(12) United States Patent
Sakamoto et al.

(10) Patent No.: US 9,005,780 B2
(45) Date of Patent: Apr. 14, 2015

(54) RARE EARTH MAGNET, METHOD FOR PRODUCING SAME AND METHOD FOR PRODUCING MULTILAYER BODY

(75) Inventors: Takeshi Sakamoto, Tokyo (JP); Masami Mori, Tokyo (JP); Yoshitomo Tanaka, Tokyo (JP); Masashi Miwa, Tokyo (JP)

(73) Assignee: TDK Corporation, Tokyo (JP)

( * ) Notice: Subject to any disclaimer, the term of this patent is extended or adjusted under 35 U.S.C. 154(b) by 1511 days.

(21) Appl. No.: 10/594,437

(22) PCT Filed: Mar. 28, 2005

(86) PCT No.: PCT/JP2005/005776
§ 371 (c)(1),
(2), (4) Date: Dec. 12, 2006

(87) PCT Pub. No.: WO2005/093766
PCT Pub. Date: Oct. 6, 2005

(65) Prior Publication Data
US 2008/0202642 A1 Aug. 28, 2008

(30) Foreign Application Priority Data

Mar. 26, 2004 (JP) .................. P2004-092706
Mar. 29, 2004 (JP) .................. P2004-096586

(51) Int. Cl.
*C22C 38/00* (2006.01)
*B32B 15/01* (2006.01)
*H01F 7/02* (2006.01)
*H01F 41/02* (2006.01)

(52) U.S. Cl.
CPC ............ *C22C 38/005* (2013.01); *Y10T 428/32* (2015.01); *B32B 15/01* (2013.01); *H01F 7/0221* (2013.01); *H01F 41/026* (2013.01)

(58) Field of Classification Search
None
See application file for complete search history.

(56) References Cited

U.S. PATENT DOCUMENTS

| | | | |
|---|---|---|---|
| 4,935,080 A * | 6/1990 | Hassell et al. | 156/154 |
| 5,316,595 A * | 5/1994 | Hamada et al. | 148/302 |
| 6,254,694 B1 * | 7/2001 | Hasegawa et al. | 148/101 |
| 6,326,087 B1 * | 12/2001 | Nishiuchi et al. | 428/611 |
| 6,562,289 B1 * | 5/2003 | Staubach et al. | 419/26 |

(Continued)

FOREIGN PATENT DOCUMENTS

| | | |
|---|---|---|
| CA | 1319034 | 5/1984 |
| JP | A 59-046008 | 3/1984 |
| JP | A 60-009852 | 1/1985 |

(Continued)

OTHER PUBLICATIONS

JP 200400291 (machine translation) Kako et al. Jan. 2004.*

(Continued)

*Primary Examiner* — Holly Rickman
*Assistant Examiner* — Lisa Chau
(74) *Attorney, Agent, or Firm* — Oliff PLC

(57) ABSTRACT

The present invention aims to provide a rare earth magnet having sufficiently excellent anticorrosion property. The rare earth magnet 1 according to the present invention to solve the above problems includes a magnet body 10 containing rare earth elements, a substantial amorphous layer 20 formed on a surface of the magnet body 10, and a protecting layer 30 on a surface of the amorphous layer 20, and the amorphous layer 20 contains material identical to main component elements of magnet material contained in the magnet body 10.

1 Claim, 13 Drawing Sheets

(56) References Cited

U.S. PATENT DOCUMENTS

2003/0012948 A1* 1/2003 Miura et al. .................. 428/328
2003/0136471 A1* 7/2003 Kikugawa et al. ............ 148/122

FOREIGN PATENT DOCUMENTS

| JP | A 60-054406 | 3/1985 |
| --- | --- | --- |
| JP | A 60-063901 | 4/1985 |
| JP | A 60-063902 | 4/1985 |
| JP | A 61-130453 | 6/1986 |
| JP | A 61-166115 | 7/1986 |
| JP | A 61-166116 | 7/1986 |
| JP | A 61-270308 | 11/1986 |
| JP | A 63-232304 | 9/1988 |
| JP | A 03-115522 | 5/1991 |
| JP | A 05-017890 | 1/1993 |
| JP | A-5-175029 | 7/1993 |
| JP | A 06-053063 | 2/1994 |
| JP | A-09-270310 | 10/1997 |
| JP | A 11-135313 | 5/1999 |
| JP | A 2001-076914 | 3/2001 |
| JP | A-2002-212602 | 7/2002 |
| JP | A 2002-520870 | 7/2002 |
| JP | A 2003-007556 | 1/2003 |
| JP | 2004002911 A * | 1/2004 |
| JP | A 2004-002911 | 1/2004 |
| JP | A-2004-064895 | 2/2004 |
| JP | A-2004-091902 | 3/2004 |
| JP | A 2005-285793 | 10/2005 |
| JP | A 2005-286031 | 10/2005 |

OTHER PUBLICATIONS

JP 2000034503 (machine translation) Ishizaka et al. Feb. 2000.*
JP 2003178918 (machine translation) Fujii et al. Dec. 2001.*
Chinese Office Action for corresponding Chinese Patent Application No. 2005800098507 issued Jun. 26, 2009.

* cited by examiner (a)

| | METHOD OF FORMING PROTECTING LAYER | PCT TEST WEIGHT REDUCTION (%) | PCT TEST Flux loss (%) | RESIDUAL FLUX DENSITY (mT) |
|---|---|---|---|---|
| EXAMPLE 1B | AMORPHIZATION | 0.04 | ERROR RANGE | 412 |
| EXAMPLE 2B | AMORPHIZATION + CHEMICAL CONVERSION TREATMENT (AQUEOUS SOLUTION OF ZINC PHOSPHATE) | BELOW MEASUREMENT LIMIT | ERROR RANGE | 402 |
| EXAMPLE 3B | AMORPHIZATION + CHEMICAL CONVERSION TREATMENT (NITRIC ACID) | 0.01 | ERROR RANGE | 408 |
| EXAMPLE 4B | AMORPHIZATION + CHEMICAL CONVERSION TREATMENT (OXYGEN PLASMA) | BELOW MEASUREMENT LIMIT | ERROR RANGE | 398 |
| COMPARATIVE EXAMPLE 1B | OXIDATION BY HEAT TREATMENT | 0.36 | 8.4 | 345 |
| COMPARATIVE EXAMPLE 2B | COATING RESIN | 0.58 | 10.5 | 353 |
| COMPARATIVE EXAMPLE 3B | CHEMICAL CONVERSION TREATMENT | 0.41 | 9.1 | 348 |

RARE EARTH MAGNET, METHOD FOR PRODUCING SAME AND METHOD FOR PRODUCING MULTILAYER BODY

TECHNICAL FIELD

The present invention relates to a rare earth magnet, particularly the rare earth magnet having a protecting layer on a surface thereof, a manufacturing method thereof, and the manufacturing method of a multilayer body comprising the rare earth magnet.

BACKGROUND ART

In recent years, the rare earth magnet such as an R—Fe—B based magnet (R means a rare earth element such as Nd) has been developed as a permanent magnet presenting a high energy of a 25 or higher MGOe product. For instance, patent document 1 and patent document 2 disclose the R—Fe—B based magnet made by sintering and that made by high speed quenching, respectively. However, these kinds of rare earth magnets contain rare earth elements, which are relatively easily oxidized, as main components resulting in very low anticorrosion property. Problems caused by this are that a magnetic performance decreases at manufacturing and use and/or that reliability of a manufactured magnet is relatively low, and so on. In order to improve such anticorrosion property of rare earth magnets, for example, as described on patent document 3 to 10, a proposal has been made to form a variety of protecting films on the surface of such magnets, so far.

More specifically, with the purpose of improving antioxidation property of the permanent magnet containing rare earths, boron, and iron as main components, patent document 3, for example, proposes the permanent magnet made by covering an antioxidation plated layer over the surface of a permanent magnet body, which contains R (where, R is at least 1 species of rare earth elements) 8 atom percents to 30 atom percents, B 2 atom percents to 28 atom percents, and Fe 4 atom percents to 90 atom percents as main components and has a main phase composed of the tetragonal crystalline phase. This patent document 3 discloses plating a metal Ni, Cu, Zn, and the like or an alloy, that has the anti-oxidizing property, or composite plating composed thereof.

On the other hand, patent document 4 discloses a method of forming the resin-made protecting layer having a thickness ranging from 5 to 25 μm on the surface of a magnet body.

[Patent document 1] Japanese Published Unexamined Patent Application No. SHO 59-46008
[Patent document 2] Japanese Published Unexamined Patent Application No. SHO 60-9852
[Patent document 3] Japanese Published Unexamined Patent Application No. SHO 60-54406
[Patent document 4] Japanese Published Unexamined Patent Application No. SHO 60-63901
[Patent document 5] Japanese Published Unexamined Patent Application No. SHO 60-63902
[Patent document 6] Japanese Published Unexamined Patent Application No. SHO 61-130453
[Patent document 7] Japanese Published Unexamined Patent Application No. SHO 61-166115
[Patent document 8] Japanese Published Unexamined Patent Application No. SHO 61-166116
[Patent document 9] Japanese Published Unexamined Patent Application No. SHO 61-270308

DISCLOSURE OF THE INVENTION

Problem to be Solved by the Invention

However, according to examination by the inventors in detail, the following problems were arisen in conventional rare earth magnets having a protecting layer. It was found that the conventional rare earth magnets have insufficient anticorrosive property.

For example, the rare earth magnet having an oxide film as the protecting layer, which is made from a surface layer of a magnet material by heat treatment, showed deterioration of magnetic characteristic such as magnetic flux of the magnet body due to exposure of the magnet body to a high temperature at a manufacturing process.

On the other hand, the rare earth magnet having the protecting layer such as a resin formed on the surface of the magnet body shows a large difference in physical properties such as coefficient of thermal expansion between the magnet body and the protecting layer. Thus, the protecting layer contacts insufficiently closely to the magnet body to cause a crack of the protecting layer and easy removal of the protecting layer. Therefore, the anticorrosion property is insufficient.

The present invention was made in consideration of the situation described above aiming to provide the rare earth magnet having a sufficiently excellent anticorrosion property.

Means for Solving Problem

The present inventors found that a specific treatment of the surface of the magnet body containing a rare earth element resulted in formation of a new layer, which had a different structure from the magnet body, around the surface thereof. They found further that the new layer was a chemically stable layer against such corrosion factor materials as oxygen, sulfide, water, and chloride and excellent in mechanical stability, resulting in completion of the present invention.

In conclusion, the rare earth magnet according to the present invention is characterized by comprising the magnet body, containing the rare earth element and an amorphous layer formed on the magnet body. The amorphous layer contains all elements constituting the magnet body.

Where, the "amorphous layer" is the layer of which constitutional elements are in an amorphous state and, in other words, an amorphous solid layer formed by aggregation without forming a crystal having a regular spatial arrangement. The above described amorphous layer in the rare earth magnet according to the present invention may not be a perfect amorphous, but may be a substantial amorphous layer.

This "substantial amorphous layer" is defined as the amorphous layer that may contain a crystal difficult to be detected by publicly known electron diffraction method and X-ray diffraction method. In general, in electron diffraction method, an electron is irradiated to a matter and a structure of the matter is analyzed from a diffraction image made by interference of an electron wave, which is scattered by individual electrons constituting the matter, by a phase difference defined by a relation between positions of atoms each other. On the other hand, in X-ray diffraction method, an X-ray diffraction image is taken from a range of a crystal and a local change of reflection intensity is observed to analyze the structure of the matter.

In general, the rare earth magnet has a polycrystal structure comprising at least the crystalline main phase containing a rare earth element and a grain boundary phase existing between main phases and containing the rare earth element. In addition, the grain boundary phase contains many lattice defects to cause diffusion of a corrosive component such as oxygen very easily to this grain boundary phase. Moreover, rare earth elements are elements inherently easy to be corroded by the corrosion component such as oxygen. Therefore, a polycrystal part exposed to the surface layer of the rare earth magnet causes development of corrosion along this grain boundary phase, finally resulting in removal of a crystal grain of the main phase.

In contrast, the rare earth magnet according to the present invention above described has a constitution comprising the amorphous layer, which covers this magnet body, on such the polycrystal magnet body. This amorphous layer has almost no regular atomic arrangement structure such as the polycrystal, but has irregular arrangement of atoms. Hence, the amorphous layer has hardly the portions where corrosive substance selectively diffuses with ease as a case of the boundary layer of the polycrystal. The corrosion component such as oxygen is difficult to diffuse in this amorphous layer. By this, this amorphous layer functions as a protecting layer to protect the polycrystal magnet body from the corrosion component such as oxygen. As a result, the rare earth magnet according to the present invention provides hardly corrosion of the boundary phase and provides excellent anticorrosion property. Moreover, as described above, this amorphous layer contains all the component elements of the magnet body. Thus, physical properties of the magnet body and the amorphous layer become close each other, and adhesiveness of the magnet body and the amorphous layer become better to prove satisfactory anticorrosion property.

The rare earth magnet according to the present invention may comprise the magnet body containing the rare earth element and the amorphous layer formed on the magnet body. The amorphous layer may be the amorphized magnet body.

As described above, the amorphous layer, which is formed from the amorphized magnet body, makes physical properties such as coefficients of thermal expansion of the magnet body and the amorphous layer very close each other. Hence, adhesiveness of the magnet body and the amorphous layer becomes better to prevent an occurrence of a crack of the amorphous layer and removal of the amorphous layer from the magnet body. By this, the rare earth magnet can demonstrate satisfactory anticorrosion property. Furthermore, the occurrence of the crack and removal of the amorphous layer takes place difficultly. Therefore, generation of contaminant particles from the rare earth magnet becomes extraordinarily rare, which is preferable.

According to the study of the inventors, it was found that when a salt spray test designated in JIS-C-0023-1989 was carried out for the rare earth magnet comprising an antioxidation plated layer disclosed in the above mentioned patent document 3, corrosion was observed on the magnet body of the rare earth magnet.

This "salt spray test" is conducted by contacting 5±1 mass % NaCl aqueous solution (pH=6.5 to 7.2) to a sample for 24 hours in a fine wet dense spray status under temperature condition of about 35° C., for example, to observe a corroded status of the sample. Pinhole generation and the like in the protecting layer (antioxidation plated layer) can be considered to be factors which cause corrosion on the magnet body by salt spray test. The pinhole generation in the protecting layer of the rare earth magnet allows a corrosion causal agent (oxygen, sulfide, water, and salt) in an atmosphere to invade from the pinhole to become the factor causing corrosion of the magnet body. Particularly, the rare earth magnet corrodes very easily. Therefore, the conventional rare earth magnet, in which corrosion is observed by the salt spray test, is not always sufficiently excellent in the anticorrosion property in an actual use environment.

The rare earth magnet according to the forementioned present invention which has the amorphous layer as described above over the surface layer thereof has the anticorrosion property to resist sufficiently against such the salt spray test. Then, the present inventors studied further to improve the anticorrosion property. As the result, it was found that another protecting layer further arranged over the outside of the amorphous layer could provide more excellent anticorrosion property.

That is, it is more preferable that the rare earth magnet according to the present invention further arranged to have a passivation layer, which is passivated by chemical conversion treatment of the amorphous layer, on the amorphous layer. In this case, the protecting layer prevents corrosion of the amorphous layer itself very effectively and hence, anticorrosion property of the rare earth magnet can be further improved.

In other words, the rare earth magnet having such the protecting layer according to the present invention comprises the magnet body containing a rare earth element, the substantial amorphous layer formed on the surface of the magnet body, and the protecting layer formed on the surface of the amorphous layer. The amorphous layer may be characterized by containing identical elements to the main component elements of a magnet material contained in the magnet body. The magnet body in this rare earth magnet also becomes mainly polycrystal.

Where, the "main component element of a magnet material" means the element necessary for the function as a magnet. For instance, if the rare earth magnet according to the present invention is R—Fe—B-based magnet, the "main component elements of a magnet material" are R, Fe, and B, if it is Sm—Co-based magnet, the "main component elements of a magnet material" are Sm and Co, and if it is Sm—Fe—N-based magnet, the "main component elements of a magnet material" are Sm, Fe, and N.

Such rare earth magnet according to the present invention as described above does not generate corrosion in the aforementioned salt spray test as the conventional rare earth magnets do. The cause of which has not been solved, but an idea of the present inventors is currently as follows. Note that the cause is not restricted to the followings.

For example, the magnet body of the rare earth magnet as an instance of the R—Fe—B-based rare earth magnets is, as shown diagrammatically in FIG. 3, constituted containing mainly the main phase 50, rare earth rich phase 60 containing relatively much rare earth elements, and boron rich phase 70 containing relatively much boron. The majority of this rare earth rich phase 60 is considered to exist between grains of the main phase 50.

Very easy corrosion of the rare earth magnet is considered to be caused by the fact that the rare earth rich phase 60 is chemically active to corrosion causative agents. That is, the rare earth rich phase 60 hardly forms the passivated film on the surface, and in addition, in comparison with the phase composed of other metals, allows easy oxidation. Therefore, it is presumed that the rare earth rich phase 60 is exposed directly to the ambient atmosphere to contact to a corrosion causative agent to generate an oxide, sulfide, and metal salt by redox reaction to the agent (i.e., corroded). And, it is the common opinion that when the rare earth rich phase 60 is corroded, the magnet body embrittles enabling the main phase 50 and the boron rich phase 70 to be removed from the surface of the magnet body, followed by deterioration of the magnet characteristics.

The magnet body of the R—Fe—B-based rare earth magnet has normally a crystal structure and, thus, has crystal defects such as point defect caused by vacancy, line defect caused by dislocation, and plane defect caused by the grain boundary. Particularly, boundaries between the main phase 50, rare earth rich phase 60, and boron rich phase 70 form a structural status similar to boundaries between crystal grains in the polycrystal and, therefore, the boundaries may exist almost grain boundaries. It is commonly known that the grain boundary causes local corrosion due to easy invasion of the corrosion causal agents.

The conventional rare earth magnet has had the protecting layer composed of such materials as metal, resin, metal oxide exemplified by $SiO_2$ (in this patent specification, silicon is included in metals) or metal nitride, on the surface of such magnet body.

Among these, the rare earth magnet having the protecting layer composed by metal as the compositional material can easily corroded in the metal itself by salt water and the corroded part of the protecting layer is penetrated by pores. As a result, such the rare earth magnet subjected to the salt spray test allows salt water to invade into the pores made by corrosion. Then, salt water penetrated through the protecting layer is considered to permeate into the rare earth rich phase and/or the crystal defect of the grain boundary on the surface of the magnet body to corrode the magnet body.

It is considered that the rare earth magnet having the protecting layer made from the metal oxide or the metal nitride as compositional materials has fixed position in a certain degree in terms of individual atoms (ions) based on a bond between a metal atom and a oxygen atom or between the metal atom and a nitrogen atom in the protecting layer. Based on this consideration, it is presumed that a vacant site (portion), in which the metal atom and the oxygen atom or the nitrogen atom cannot exist, exists in the protecting layer and the vacant site produces fine pinholes or defects. As the result, such the rare earth magnet subjected to the salt spray test allows salt water to invade into the pinholes. Then, salt water penetrated through the protecting layer permeates into the rare earth rich phase and/or the crystal defect of the grain boundary on the surface of the magnet body to corrode the magnet body.

In addition, the rare earth magnet having the protecting layer made from a resin as a compositional material uses such a wet process as a solution application method as a method for forming the protecting layer, and hence, the protecting layer generates an internal stress at drying or heating the solution to cause an occurrence of a gap such as a crack in the protecting layer. As the result, such the rare earth magnet subjected to the salt spray test allows salt water to invade into the crack. Then, salt water penetrated through the protecting layer permeates into the rare earth rich phase, the crystal defect of the grain boundary of the surface of the magnet body, and/or a distorted part of the surface of the magnet body in accordance with the crack in the protecting layer to corrode the magnet body.

On the other hand, the rare earth magnet according to the present invention has a substantial amorphous layer (hereinafter referred to as "amorphous layer") formed between the magnet body and the protecting layer. Owing to this it is presumed that the invasion of salt water into the magnet body through the protecting layer is disturbed by the amorphous layer, and thus the magnet body is prevented to corrode. That is, it can be said that the amorphous layer, even in the case where the pinhole has been formed in the protecting layer, takes a role of covering this pinhole.

In such the amorphous layer, there exists almost no atomic arrangement specific to a crystal condition and constitutional elements mingle isotropically and evenly each other. Therefore, there exists substantially no crystal defect such as the grain boundary as described above and a vacancy, to which salt and the like can move, is hardly generated in the layer. Moreover, since the amorphous layer is provided, deformation mechanisms based on dislocation loop, which can exist in the layer, occurs hardly, and hence the influence of an external stress and a residual stress are also very small. Owing to this it is presumed that the rare earth magnet according to the present invention shows a high anticorrosion property of the amorphous layer. On the other hand, the amorphous layer has almost no rare earth rich phase 60, which is corroded easily. From such view point, it is presumed that the amorphous layer shows the high anticorrosion property. As a result, the amorphous layer can prevent invasion of salt water into the magnet body, and therefore it is presumed that corrosion of the magnet body can be sufficiently prevented.

Further, in the rare earth magnet according to the present invention, even in the case that there is a local crystal phase in the amorphous layer, if there are no pinholes and cracks as described above in a protecting layer area on the region where the crystal phase exists, the crystal phase never contacts to salt water.

Concludingly, it is presumed that in the rare earth magnet according to the present invention, when the pinhole and the crack exists in a certain region in the protecting layer and the crystal phase does not exist in the amorphous layer region located under the region, corrosion does not proceed accompanying invasion of salt water. And, an existence probability of such region is made by multiplying existence probabilities of those regions in the protecting layer and in the amorphous layer, which becomes very low. Consequently, the present inventors presume that the rare earth magnet according to the present invention has a sufficiently excellent anticorrosion property.

In addition, among the rare earth magnet applications, ones in which the rare earth magnet is exposed to a relatively severe atmosphere include an automobile motor, a special motor, a servo motor, a linear actuator, a voice coil motor, an equipment motor, industrial motor and the like. Considering these applications, the rare earth magnet according to the present invention without any corrosion in the test as mentioned above has a sufficiently excellent anticorrosion property.

In the rare earth magnet according to the present invention, it is preferable that the composition ratio of elements contained in the amorphous layer as described above is substantially identical to the composition ratio of main component elements contained in the magnet body. Specifically, for example, in the case where the magnet body included in the rare earth magnet is the R—Fe—B-based magnet, it is preferable that the composition ratio of the main component elements contained in the magnet body, which are R, Fe, and B, are substantially identical to that of those elements in the amorphous layer.

For such rare earth magnet, the magnet body and the amorphous layer can be prepared from the same material and no adjustment is necessary for those composition ratios. Hence, manufacturing steps can be normally simplified. In addition, formation of the magnet body and formation of the amorphous layer can be continuously conducted. Therefore, an impurity layer on the magnet body surface is hardly formed to prevent further a malfunction such as amorphous layer peeling and anticorrosion property deterioration caused by the impurity layer.

For the rare earth magnet according to the present invention, it is preferable that an arithmetic mean roughness Ra of the protecting layer surface on the side of the amorphous layer ranges from 0.1 to 1.5 μm.

Here, the arithmetic mean roughness Ra is the one defined by JIS-B-0601-1994. More specifically, a reference length L is cut out from an arbitrary roughness curve of the amorphous layer surface in a mean line direction, the X axis is defined in the mean line direction of the cut portion and Y axis in the vertical direction, and the roughness curve is expressed by y=f(X). Ra value is calculated by the following equation (1).

[Mathematical Formula 1]

$$Ra = \frac{1}{L}\int_0^L |f(x)|\,dx \quad (1)$$

According to the present invention, the surface of the rare earth magnet, on which the protecting layer is formed, is a rough surface having a given arithmetic mean roughness Ra and, therefore, the protecting layer is firmly adhered to the amorphous layer. Consequently adhesion property of the amorphous layer to the protecting layer becomes satisfactory and peeling of the protecting layer from the amorphous layer hardly occurs.

Here, when the arithmetic mean roughness Ra becomes larger than 1.5 μm, in the case where a film thickness of the protecting layer is relatively thin, the local film thickness of the protecting layer area at projected portions on the amorphous layer surface becomes very thin and there is a tendency of easy occurrence of pinholes in such areas. In addition, when the local film thickness is relatively thick, the local film thickness of the protecting layer area at recessed portions on the amorphous layer surface becomes very thick and the magnetic characteristic of the rare earth magnet in such areas tends to be deteriorated. On the other hand, when the arithmetic mean roughness Ra becomes smaller than 0.1 μm, the protecting layer has a tendency of easy peeling off the amorphous layer.

Furthermore, in the rare earth magnet according to the present invention, it is preferable that the amorphous layer is obtained by bombarding the surface of the magnet body with solid particles or particle beams to denature the vicinity of the magnet body surface.

Here, the "solid particle" is a solid matter such as an abrasive grain in particle state and the "particle beam" is a group of microscopic particles that go as a thin flow having a common progress direction and hardly collide internally.

Such rare earth magnet can have sufficiently excellent anticorrosion property. Though the cause thereof is not elucidated, the current explanation of the present inventors is as follows. However, the cause is not restricted to the followings.

That is to say, when by jet of solid particles or irradiation of particle beams these solid particles or particle beams are bombarded against the magnet body surface, the bombarded surface region is rapidly heated and melted. This heated region is rapidly cooled and recoagulated by thermal diffusion to the inside of the magnet body. It is presumed that through these steps, the surface of the magnet body, the temperature of which is raised to around the melting point for a short time, is cooled rapidly and then the amorphous layer is formed.

Concerning the solid particles, it is also presumed that an impact force of the particles themselves to the surface works. Namely, it is presumed that the surface of the magnet body is beaten by the solid particles and so-called forging action takes place, resulting the amorphous layer formation due to the compression deformation in the vicinity of the magnet body surface.

The rare earth magnet according to the present invention is characterized by comprising the magnet body containing the rare earth element, the amorphous layer obtained by bombarding the magnet body surface with solid particles or particle beams to denature the vicinity of the magnet body surface, and the protecting layer formed thereon. Such rare earth magnet has the same amorphous layer as described above and can provide sufficiently excellent anticorrosion property.

In the rare earth magnet according to the present invention, it is preferable that the amorphous layer has a thickness ranging from 0.01 to 20 μm. Amorphous layer having a depth less than 0.01 μm from the surface thereof has a tendency of insufficient anticorrosion property. On the other hand, amorphous layer having a depth beyond 20 μm from the surface thereof does not improve the anticorrosion property any more and has a tendency of causing a higher cost for amorphization resulting in inefficiency.

In the rare earth magnet according to the present invention, it is preferable that the protecting layer is comprised of metal, metal oxide, metal nitride, oxynitride, chemically converted film, or resin. These protecting layers formed on the amorphous layer can improve prominently the anticorrosion property of the rare earth magnet.

More specifically, the protecting layer is preferably composed of at least one kind of elements selected from a group composed of aluminum, tantalum, zirconium, hafnium, niobium, silicon, titanium, magnesium, chromium, nickel, barium, molybdenum, vanadium, tungsten, zinc, strontium, iron, bismuth, boron, calcium, gallium, germanium, lanthanum, lead, and indium.

Further, the protecting layer is also preferably composed of an oxide of at least one kind of elements selected from a group composed of aluminum, tantalum, zirconium, hafnium, niobium, silicon, titanium, magnesium, chromium, nickel, barium, molybdenum, vanadium, tungsten, zinc, strontium, iron, bismuth, boron, calcium, gallium, germanium, lanthanum, lead, and indium.

Further, the protecting layer may be composed of an nitride of at least one kind of elements selected from a group composed of silicon, aluminum, tantalum, titanium, zirconium, hafnium, niobium, magnesium, chromium, nickel, molybdenum, vanadium, tungsten, iron, boron, gallium, germanium, bismuth, manganese, barium, lanthanum, yttrium, calcium, strontium, cerium, and beryllium.

Furthermore, the protecting layer is also preferably composed of an oxynitride of at least one kind of elements selected from a group composed of silicon, aluminum, tantalum, titanium, zirconium, hafnium, niobium, magnesium, chromium, nickel, molybdenum, vanadium, tungsten, iron, boron, gallium, germanium, bismuth, manganese, barium, lanthanum, yttrium, calcium, strontium, cerium, and beryllium.

In addition the protecting layer may be the chemically converted film containing at least one kind of elements selected from a group composed, of chromium, cerium, molybdenum, tungsten, manganese, magnesium, zinc, silicon, zirconium, vanadium, titanium, iron, and phosphor.

Further additionally, the protecting layer is also preferably composed of a resin of at least one kind of selected from a group composed of a phenolic resin, epoxy resin, melamine resin, and xylene resin.

A manufacturing method of the rare earth magnet according to the present invention is a preferable method for manufacturing the same and is characterized by having an amorphization process of amorphizing the surface layer of a polycrystal magnet body containing the rare earth element.

According to this method, as described above, the amorphous layer can be formed to function as the protecting layer for protecting the magnet body from a corrosive component such as oxygen and, thus, the obtained rare earth magnet becomes excellent in the anticorrosion property. In addition, the amorphous layer is made by amorphizing the magnet body and hence, the adhesion property to the magnet body becomes better to prevent the occurrence of cracks and peeling off.

In addition, such an amorphization process of amorphizing the magnet body can be carried out by applying a shock to the surface layer of the magnet body and by irradiating a particle beam (atomic beam, molecular beam, ion beam, and electron ray beam) on the surface layer of the magnet body and hence, the magnet body cannot be exposed to a high temperature. Therefore, the magnetic characteristic such as magnetic flux of the magnet body is not deteriorated virtually during manufacturing process and a sufficiently excellent magnetic characteristic can be brought into play.

In this way, in the amorphization process, it is preferable to apply a shock to the surface layer of the magnet body to amorphize the surface layer of the magnet body. By this, the surface layer of the magnet body can be easily amorphized. On the other hand, in comparison with amorphization by irradiating the atomic beam, molecular beam, ion beam, electron ray, and the like, there is a tendency enabling to form a more compact amorphous layer. By this, corrosion of the amorphous layer itself can be suppressed sufficiently.

The reason why applying a shock to amorphize the magnet body is presumed to be the fact that, for example, receiving a mechanical shock gives a compression stress or a shearing stress on the surface layer of the magnet body to cause a plastic deformation, resulting in turbulence of the regular structure of atoms to make the amorphous state.

More specifically, in the amorphization process, it is preferable to bombard the surface layer of the magnet body with particle groups. It is preferable to give a shock to the surface layer of the magnet body by using a method such as blast or shot peening.

By this, a suitable shock can be easily and repeatedly given to the surface layer of the magnet body. Particularly, using a globular particle group can give the shock while suppressing sufficiently abrasion of the surface layer of the magnet body, which can make amorphization very efficiently. Materials of particles include, for example, ceramic materials such as $SiO_2$, SiC, and $Al_2O_3$. Metal materials such as steel shots can also be used as the material of particles.

In the amorphization process, it is preferable to amorphize the part, the depth of which ranges from 0.01 to 20 μm from the surface of the magnet body. The amorphization of only the part with the depth less than 0.01 μm from the surface results in a tendency of inhibiting anticorrosion property. On the other hand, the amorphization of only the part with the depth beyond 20 μm from the surface, results in a tendency that anticorrosion property is not improved any more, requiring higher cost for amorphization and causing inefficiency.

Moreover, in order to form the protecting layer described above over the outside of the amorphous layer, it is preferable to carry out further a chemical conversion treatment to form a passivation layer on the surface layer of the amorphous layer following the amorphization process. In this case, the protecting layer reduces further corrosion of the amorphous layer itself, and anticorrosion property of the rare earth magnet can be further improved.

More specifically, in the chemical conversion treatment, it is preferable to contact at least one of nitric acid, an aqueous solution of zinc phosphate, oxygen plasma, and ozone to the surface layer of the amorphized layer.

The manufacturing method of the rare earth magnet having a protecting layer, according to the present invention, may be characterized by comprising a process of bombarding the surface layer of the magnet body containing the rare earth element with solid particles or particle beams and a process of forming a protecting layer on the surface layer of the magnet body after the bombarding process described above.

The magnet body exposed to air forms normally a thin oxide film (if water is contained, the passivated film) having the thickness of about some nanometers on the surface of the magnet body. It is presumed that the rare earth magnet being formed with a protecting layer on the magnet body, adhesion property of the protecting layer with the magnet body lowers, and hence the protecting layer is easily peeled off the magnet body.

However, according to the manufacturing method of the rare earth magnet of the present invention, it is possible to remove the corroded part on the magnet body surface by etching effect of the particles when forming the amorphous layer by bombarding the magnet body surface with particles.

In addition, normally, the magnet body is manufactured by sintering an alloy having a diameter of some micrometers and the magnet body surface after sintering becomes irregular. In such a condition, forming a protecting layer through plating, evaporating, resin coating, and the like tends to have a difficulty to obtain a uniform thickness of the protecting layer film. The present inventors have found that the film thickness of 10 μm or more in case of metal plating protecting layer and the film thickness of 20 μm or more in case of resin coating protecting layer provides reliability as a protecting layer. However, the projected portion of the magnet body surface has the less thickness than those and tends to generate pinholes. Therefore, it is presumed that the magnet body can be easily corroded.

Normally, such problems can be presumably avoided by adding a surface controlling step, which is dissolving the rare earth rich phase on the magnet body surface by an acid to remove main phase particles around the surface. It has been generally confirmed that such a step improves the arithmetic mean roughness Ra of the magnet body surface by about 1 to 2 μm. However, the present inventors found that even if the arithmetic mean roughness Ra is around 2 μm, the above problems still remain. Consequently, it is presumed that even if such the step is added, it is difficult to avoid the above problems completely.

However, according to the manufacturing method of the rare earth magnet of the present invention, in comparison with the above-described surface treatment method by the acid, the irregular surface of the magnet body can be made more flat. As one cause, the followings can be presumed, however, causes are not restricted to these. It is presumed that in the bombarding process as described above, the projected portion of the magnet body surface is bombarded with more solid particles or more particles beam than the recessed portion due to the projected length. Thereby, it is presumed that in the present invention, above mentioned bombarding process enables the surface to be flat more easily in comparison with the surface treatment method by using the acid, by which both the projected portion and the recessed portion are ready to be acted.

According to the manufacturing method of the rare earth magnet of the present invention, it is preferable to be bombarded with solid particles or particle beams in the bombarding process so that the amorphous layer is formed by deforming the vicinity of the magnet body surface.

By this, the amorphous layer can be easily formed on the magnet body. Therefore, in the protecting layer formation process, when the protecting layer is further formed on the surface of the amorphous layer, similar to the rare earth magnet of the present invention as described above, the magnet excellent in anticorrosion property can be easily prepared. In addition, owing to forming the amorphous layer by denaturing a part of the magnet body, the composition ratio of elements contained in the amorphous layer can be made substantially identical to the composition ratio of main component elements contained in the magnet body.

Further, according to this manufacturing method of the rare earth magnet, adjusting velocity of particles and diameter of particles to be bombarded to the magnet body allows the arithmetic mean roughness Ra of the amorphous layer surface to be 0.1 to 1.5 μm as described above. Consequently, this manufacturing method of the rare earth magnet can form preferably the protecting layer on the amorphous layer surface.

On the other hand, when preparing the rare earth magnet having the protecting layer made of resin as the compositional material, a wet process such as the solution application method is used as a forming method of the protecting layer. Such a wet process uses an acidified aqueous solution in general. In the case where the protecting layer is formed by using the acidified aqueous solution on the surface of the magnet body having such constitution, it is presumed that the rare earth rich phase 60 containing relatively big quantity of the rare earth elements having an extremely low redox potential (standard electrode potential) contacts to the acidified aqueous solution starting from the portion located on the magnet body surface to form a local battery collaborating with the main phase 50 or boron rich phase 70. By this, the rare earth rich phase 60 liquates gradually starting from the part existing on the magnet body surface to result in a phenomenon like grain boundary corrosion. As the result, it is presumed that the magnetic characteristic of the magnet body has a tendency of becoming insufficient. In order to prevent this corrosion, the present inventors found that Ni plating having the film thickness of 10 μm or more should be previously formed on the magnet body surface.

However, according to the manufacturing method of the rare earth magnet of the present invention, such a wet process is applied after the amorphous layer is formed on the magnet body surface. The amorphous layer is a layer which is difficult to be oxidized as described above, which takes a role of protecting the magnet body against the acidified aqueous solution, similar to Ni plating described above. As the result, when using those made from the resin for the constitutional material as the protecting layer, it is possible to prevent effectively corrosion of the magnet body in the protecting layer formation process.

In the manufacturing method of the rare earth magnet of the present invention, it is preferable that the particle beam described above is a neutral particle beam, ion beam, molecular beam, or radical beam. As a method for bombarding such beams to a matter surface, publicly known methods such as blast treatment, ion beam treatment, and plasma treatment can be applied and therefore, the amorphous layer can be formed more easily on the magnet body surface by applying the above methods. Particularly, if the above particle beam is the one generated by plasma discharge, the amorphous layer can be formed more efficiently and more assuredly, which is further preferable.

Moreover, the manufacturing method of the multilayer body according to the present invention is characterized by bombarding the surface of the magnet body containing the rare earth element with solid particles or particle beams to denature the vicinity of the magnet body surface as described above to the amorphous layer. This multilayer body can be used as a member for forming the rare earth magnet according to the present invention as described above.

In the manufacturing method of the multilayer body according to the present invention, it is preferable that the particle beam is neutral particle beam, ion beam, molecular beam, or radical beam. Particularly, if the particle beam is the one generated by plasma discharge, the amorphous layer can be formed more efficiently and more assuredly, which is further preferable.

Effect of the Invention

According to the present invention, the rare earth magnet having the sufficiently excellent anticorrosion property can be provided. Further, the manufacturing method of such rare earth magnet can be provided.

BRIEF DESCRIPTION OF THE DRAWINGS

FIG. 13 A table showing a PCT test result of the rare earth magnet of embodiments 1B to 4B and comparative examples 1B to 3B.

DESCRIPTION OF THE REFERENCE SYMBOLS

Figure 1:
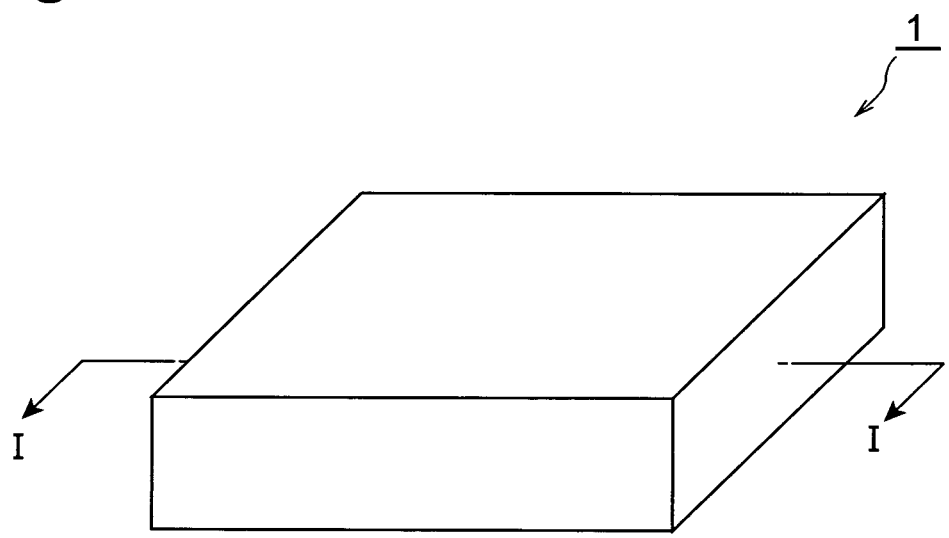
FIG. 1 A schematic perspective view showing a rare earth magnet according to the first embodiment.

1 . . . rare earth magnet, 10 . . . magnet body, 20 . . . amorphous layer, 30 . . . protecting layer, 180 . . . abrasive grain (solid particle), 510 . . . magnet body, 520 . . . amorphous layer, 530 . . . passivation layer, 580 . . . particle group, 600 . . . rare earth magnet.

BEST MODES FOR CARRYING OUT THE INVENTION

Preferred embodiments according to the present invention are described in detail below with reference to the drawings if required. In the drawings, identical reference symbols are given to same elements and duplicate descriptions will be omitted. In addition, positional relations such as top, bottom, left side, and right side are those based on the positional relations shown in drawings, unless otherwise stated. Moreover, a size proportion of the drawings is not restricted to the proportions illustrated.

First Embodiment

Firstly, the rare earth magnet and the manufacturing method thereof according to the first embodiment will be described hereinafter. The rare earth magnet according to the first embodiment comprises the magnet body, the amorphous layer covering the magnet body, and the protecting layer covering the amorphous layer.

Figure 2:
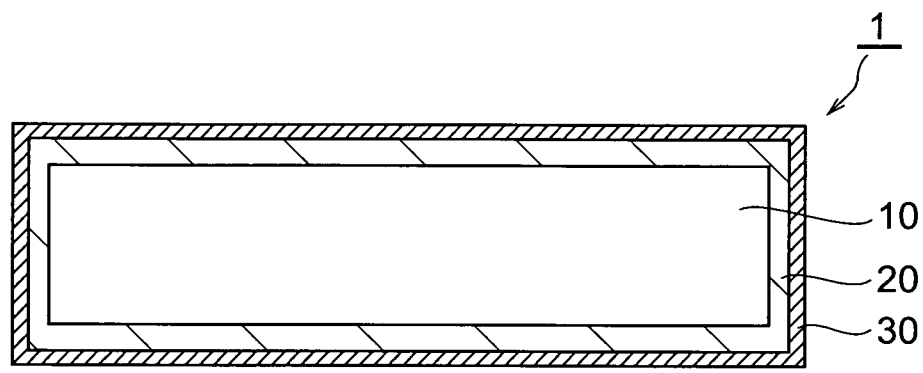
FIG. 2 A sectional view along the I-I line of the rare earth magnet shown in FIG. 1.

FIG. 1 is a schematic perspective view showing the rare earth magnet according to the first embodiment and FIG. 2 is a view showing diagrammatically a section appearing by cutting along the I-I line of the rare earth magnet in FIG. 1. As shown in FIG. 1 and FIG. 2, the rare earth magnet 1 according to the embodiment comprises a multilayer body composed of magnet body 10, and amorphous layer 20 formed to cover the whole surface of the magnet body 10, and protecting layer 30 formed to cover the whole surface of the amorphous layer 20, which is arranged with the multilayer body.

Magnet body 10 contains R, iron (Fe) and boron (B). R represents one or more species of rare earth elements and, specifically, expresses one or more species of elements selected from a group composed of scandium (Sc), Yttrium (Y) and lanthanoids that belong to Group III of the long periodic table. Here, lanthanoids include lanthanum (La) cerium (Ce) praseodymium (Pr) neodymium (Nd) samarium (Sm) europium (Eu) gadolinium (Gd) terbium (Tb) dysprosium (Dy) holmium (Ho) erbium (Er) thulium (Tm) ytterbium (Yb) lutetium (Lu).

It is preferable that the compositions of the above elements in the magnet body 10 are as described below, when the magnet body 10 is manufactured by sintering method.

R preferably includes one or more species of elements of Nd, Pr, Ho, and Tb out of those described above and in addition, preferably also includes one or more species of elements of La, Sm, Ce, Gd, Er, Eu, Tm, Yb, and Y.

It is preferable that a proportion of the contained R in the magnet body 10 ranges from 8 to 40 atom percents of an amount of all atoms constituting the magnet body 10. When the proportion of the contained R is less than 8 atom percents, a crystal structure becomes a cubic system tissue having an identical structure to that of α-iron. Hence, there is the tendency that the rare earth magnet 1 having a high coercive force (iHc) is not obtained. Meanwhile, when the proportion of the contained R is more than 30 atom percents (particularly 40 atom percents), an R-rich nonmagnetic phase becomes more and there is a tendency that a residual flux density (Br) of the rare earth magnet 1 is lowered.

It is preferable that the proportion of the contained Fe in the magnet body 10 ranges from 42 to 90 atom percents of the amount of all atoms constituting the magnet body 10. When the proportion of the contained Fe is less than 42 atom percents, there is a tendency that Br of the rare earth magnet 1 lowers and when more than 90 atom percents, there is a tendency that iHc of the rare earth magnet 1 lowers.

It is preferable that the proportion of the contained B in the magnet body 10 ranges from 2 to 28 atom percents of the amount of all atoms constituting the magnet body 10. When the proportion of the contained B is less than 2 atom percents, the crystal structure becomes a rhombohedral tissue, and thus there is a tendency that iHc of the rare earth magnet 1 becomes insufficient. On the other hand, in excess of 28 atom percents, there is a tendency that a B-rich nonmagnetic phase becomes more to lower Br of the rare earth magnet 1.

Magnet body 10 may be composed by substituting partially Fe to cobalt (Co). There is a tendency that such composition can improve a temperature characteristic without a loss of magnetic characteristics of the rare earth magnet 1. In this case, the proportion of the contained Fe and Co after the substitution is preferably 0.5 or lower in Co/(Fe+Co) by the atomic standard. In excess of a substituted amount of Co than this, there is a tendency that magnetic characteristics of the rare earth magnet 1 lower.

Further, the magnet body 10 may be constituted by such a way that B is substituted partially by one or more species of elements selected from the group composed of carbon (C), phosphor (P), sulfur (S) and copper (Co). There is a tendency that such a composition improves productivity of the rare earth magnet 1 enabling to reduce production cost thereof. In this case, it is preferable that the amounts of these contained C, P, S, and/or Cu is 4 or less atom percents of the amounts of all atoms constituting the magnet body 10. When the amounts of contained C, P, S, and/or Cu is more than 4 atom percents, there is a tendency that magnetic characteristics of the rare earth magnet 1 deteriorate.

Also, in view of improving the coercive force of the rare earth magnet 1, improving productivity, and reducing cost, one or more species of elements selected from aluminum (Al), titanium (Ti), vanadium (V), chromium (Cr), manganese (Mn), bismuth (Bi), niobium (Nb) tantalum (Ta), molybdenum (Mo), tungsten (W), antimony (Sb), germanium (Ge), tin (Sn), zirconium (Zr), nickel (Ni), silicon (Si), gallium (Ga), copper (Cu) and/or hafnium (Hf), and the like may be added to constitute the magnet body 10. In this case, the amount of the added elements described above is preferably 10 or less atom percents of the amounts of all atoms constituting the magnet body 10. When the amount of these added elements exceeds 10 atom percents, there is a tendency that magnetic characteristics of the rare earth magnet 1 lower.

Magnet body 10 may contain oxygen (O) nitrogen (N) carbon (C) and/or calcium (Ca) and the like as inevitable impurities in a range of 3 or lower atom percents of the amounts of all atoms constituting the magnet body 10.

Figure 3:
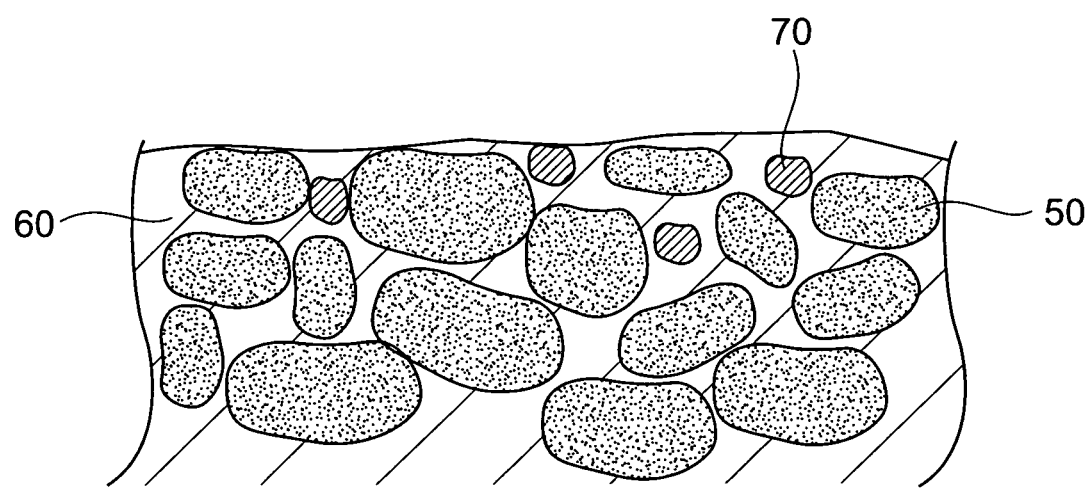
FIG. 3 A diagrammatic enlarged view showing a phase constitution of a R—Fe—B-based magnet.

Magnet body 10 is, as shown in FIG. 3, formed by containing the main phase 50 having a substantially tetragonal crystal structure, rare earth rich phase 60 containing relatively much rare earth elements, and boron rich phase 70 containing relatively much boron. The grain size of the main phase 50 as a magnetic phase ranges preferably from about 1 to 100 μm. Rare earth rich phase 60 and boron rich phase 70 are the nonmagnetic phase and located in the grain boundary of the main phase 50. These rare earth rich phase 60 and boron rich phase 70 are contained in the magnet body 10 in a range from about 0.5 volumetric percents to 50 volumetric percents.

Magnet body 10 is manufactured by, for example, sintering method as described below. First, a desired composition containing the element described above is cast to obtain ingots. Subsequently, the obtained ingots are roughly pulverized in a range from about 10 to 100 μm grain size by using a stamping mill, and then compactly pulverized in a range from about 0.5 to 5 μm grain size using a ball mill to obtain powder.

Next, the obtained powder is molded preferably in a magnetic field to obtain a mold. In this case, a magnetic field strength is preferably 10 or higher kOe in the magnetic field and a molding pressure ranges preferably from about 1 to 5 ton/cm$^2$.

Next, the obtained mold is sintered at 1000 to 1200° C. for 0.5 to 5 hours followed by quenching. A sintering atmosphere is preferably an inert gas atmosphere such as Ar gas. And preferably in the inert gas atmosphere, thermal treatment (age hardening) is conducted at 500 to 900° C. for 1 to 5 hours to obtain the magnet body 10 as described above.

Magnet body 10 can be, other than described above, prepared by, for example, publicly known ultra-rapid quenching, warm brittle processing, casting and mechanical alloying. In addition, magnet body 10 may be the one commercially available.

(Amorphous Layer)

Amorphous layer 20 contains R, iron (Fe), boron (B) and includes the same compositional materials as the magnet body 10. However, the magnet body 10 is composed of the crystal structure and in contrast, the amorphous layer 20 is composed of an amorphous structure. Particularly, the amorphous layer 20 is preferably substantially same composition ratio as described for the magnet body 10 above. Such amorphous layer 20 can be bound firmly with the magnet body 10 to prevent distortion in a boundary face. That is, it is preferable that the amorphous layer 20 is the one converted from the crystal structure of the magnet body 10 to the amorphous structure.

Amorphous layer 20 is formed by bombarding solid particles or particle beams to the surface of magnet body 10. In this way, when the amorphous layer 20 is formed by a surface processing of the magnet body 10, it is a possible view that the magnet body 10 has an amorphous region around its surface.

It is also presumed that around the boundary between magnet body 10 and amorphous layer 20, a crystal phase (crystal grain) is mixed with an amorphous phase (amorphous grain). In this case, amorphous layer 20 may, as described above, contain the crystal phase which is difficult to be detected by publicly known electron diffraction method and X-ray diffraction method. Moreover, the content proportion of the crystal phase, among the crystal phase and the amorphous phase, may change continuously from the magnet body 10 to the amorphous layer 20. In this case, amorphous layer 20 according to the present embodiment may, similar to what described above, contain crystals which are difficult to be detected by publicly known electron diffraction method and X-ray diffraction method.

Hereinafter, as specific examples of methods for forming amorphous layer 20, the blast treatment, ion beam treatment, and plasma treatment are described. First, the blast treatment is described.

The blast treatment is the surface treatment carried out by blasting abrasive grains, which are solid grains, to a solid surface to bombard abrasive grains to the surface. The blast treatment used in the present embodiment is so-called dry blast processing by blasting only abrasive grains using compressed air.

Figure 4:
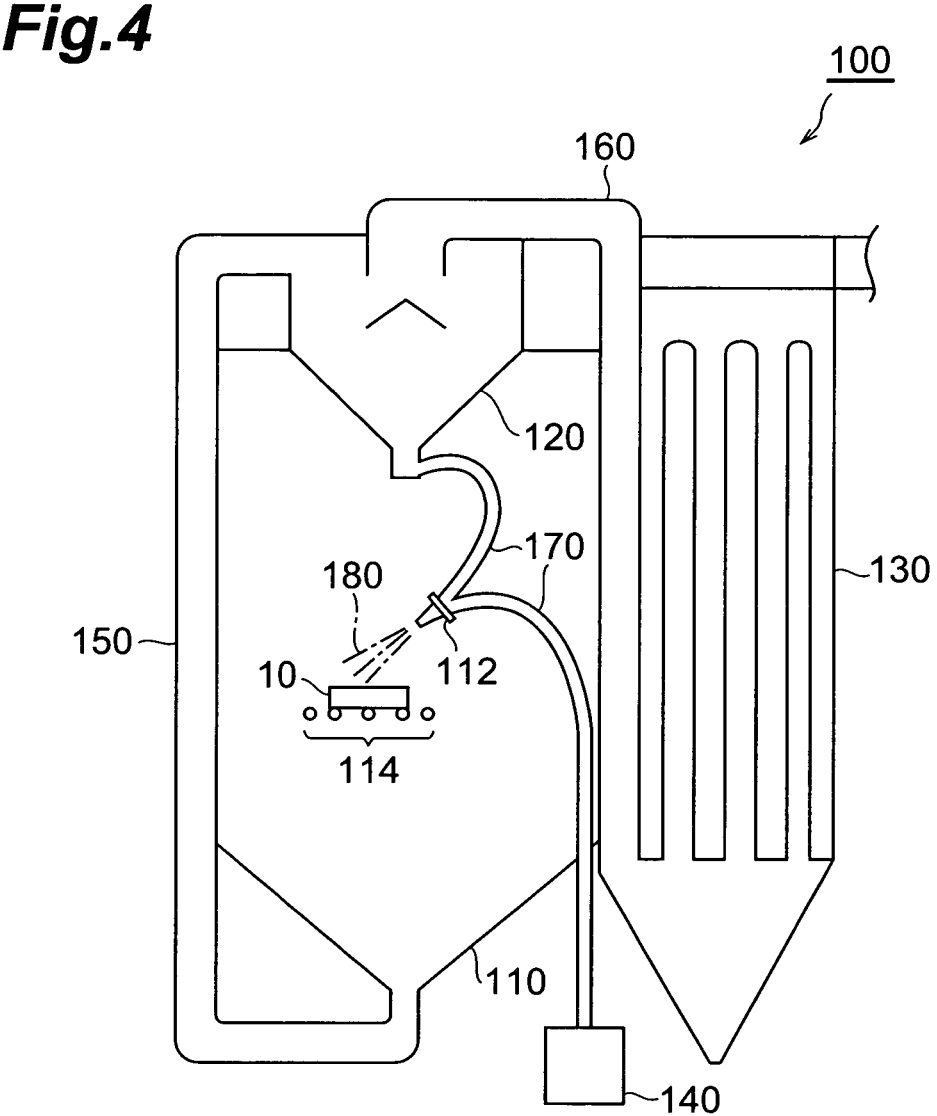
FIG. 4 A frontal diagrammatic view of a blast treatment equipment used in the method for manufacturing the rare earth magnet according to the preferred embodiment.

Blast treatment apparatus 100 used in the present embodiment comprises, as shown in FIG. 4, blast apparatus main body 110, classification apparatus 120, dust collector 130, compressed air supply apparatus 140 and the blast apparatus main body has jet nozzle 112.

Blast apparatus main body 110 is connected to classification apparatus 120 through main body duct 150 and classification apparatus 120 is connected to dust collector 130 through dust collection duct 160. Blast apparatus main body 110 is arranged to be in a negative pressure state constantly with respect to outside air due to a negative pressure by dust collector 130, so that abrasive grains 180 jetted from jet nozzle 112 do not disperse from the blast apparatus main body 110. Classification apparatus 120 and compressed air supply apparatus 140 are connected to jet nozzle 112 through supply duct 170 respectively. At the jetting orifice side of jet nozzle 112, magnet body 10 is mounted on rollers 114.

Using blast treatment apparatus 100 constituted in such a way, abrasive grains 180 jetted from jet nozzle 112 by a high pressure gas supplied from air supply apparatus 140 are bombarded against the surface of the magnet body 10 on rollers 114 and the blast treatment is performed. Thereafter, abrasive grains 180 are transferred from the blast apparatus main body 110 to classification apparatus 120 by airflow produced by the negative pressure generated by the dust collector 130. Classification apparatus 120 such as a cyclon separates the transferred abrasive grains 180 into reusable abrasive grains, pulverized and unusable abrasive grains, and dusts from the surface of an object to be processed. Among these, reusable abrasive grains are again supplied to jet nozzle 112 and pulverized abrasive grains and dusts from the surface of the ground process object are collected by the dust collector 130. In such a way, only reusable abrasive grains are bombarded repeatedly to the surface of the magnet body 10, thereby blast treatment is continuously conducted in a stable treatment condition.

As abrasive grains 180 for blast treatment, solid grains such as SiC, alumina ($Al_2O_3$) and steel materials can be used. Particularly, the steel material can be preferably used for easy forming of a middle layer 20.

A mean grain size of abrasive grains 180 ranges preferably from 0.1 to 3.0 mm. The mean grain size of abrasive grains 180 less than 0.1 mm reduces the collision force (collision energy) per 1 grain against the magnet body 10 causing a tendency that the amorphous layer 20 having a desired film thickness is difficult to be formed. On the other hand, the mean grain size of abrasive grains 180 exceeded 3.0 mm causes a large collision force per 1 grain against the magnet body 10 resulting in a tendency that breaking and cracking occur easily in the magnet body.

Although a gas used for carrying abrasive grains in the blast treatment is air in general, such inert gases as nitrogen, argon, neon, and xenon can be used depending on the constitutional material of the magnet body 100. It is preferable that these gases are dry in view of avoiding an oxidation reaction of Nd. It is preferable that the pressure created from jet nozzle 112 ranges from 0.1 to 1 MPa in view of smoothing the surface and avoiding swells of the surface.

Shapes of abrasive grains 180 are not restricted specifically but it is preferable to be globular substantially. Here, the substantially globular shape is such a concept that a shape of not only globular but also an ellipsoid shape is included, no sharp angular corner and side are provided, it is enough to be almost globular rather than square, and no strict globule shape is required. When such substantially globular abrasive grains are used, it is presumed that a striking function rather than a cutting function, namely a forging function works dominantly on the surface of magnet body 10, which facilitates to form amorphous layer 20. And substantially globular abrasive grains provide relatively uniform collision force regardless the portion of grain surface involved in collision against the object to be processed in comparison with square abrasive grains. Thereby it becomes easier to form the amorphous layer 20 having the desired film thickness by adjusting a blowoff pressure of abrasive grain carrier.

In order to form the amorphous layer 20 by using such a blast treatment, it is recommendable to use rollers 114 for keeping the magnet body 10 in motion in a predetermined speed so as to bombard abrasive grains 180 blown out from the jet nozzle 112 against the whole surface of the magnet body 10. Then, the magnet body 10 is relocated so that another face opposes to the jet nozzle 112 to proceed the similar process. In such a way, the same jetting operation is repeated for 6 faces of the magnet body 10 so as to form the amorphous layers 20 covering the whole area of the magnet body 10.

The followings are descriptions of the ion beam treatment.

Figure 5:
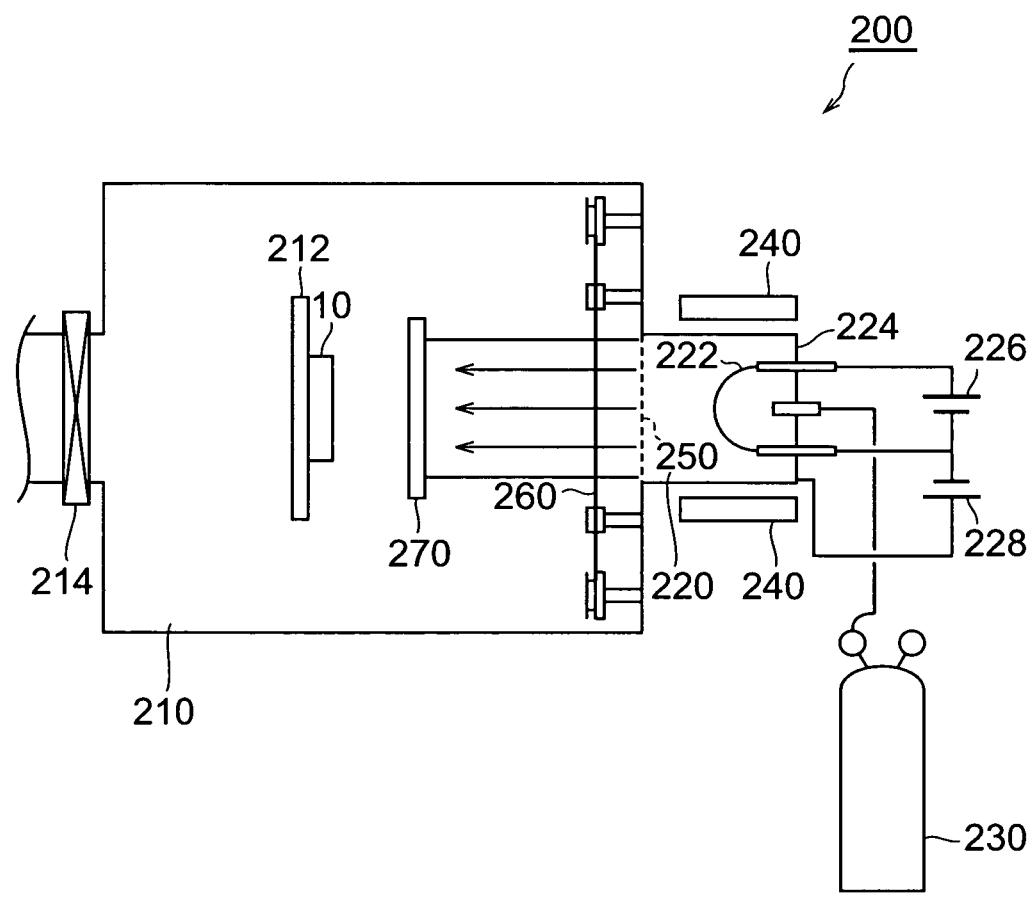
FIG. 5 A frontal diagrammatic view of an ion beam treatment equipment used in the method for manufacturing the rare earth magnet according to the preferred embodiment.

An ion beam treatment apparatus 200 used for the present embodiment has, as shown in FIG. 5, beam treatment chamber 210 for irradiating a beam to the magnet body and a plasma generation chamber 220 for generating plasma to be used as a beam source. In the beam treatment chamber 210, a stage 212 is installed to mount the magnet body 10 to position oppositely to the plasma generation chamber 220. Grid 250, neutrizer 260 and shutter 270, which are mentioned later, are disposed in this order between the plasma generation chamber 220 and the stage 212, from the side of the plasma generation chamber 220. Meanwhile, beam treatment chamber 210 is connected to an exhaust system such as TMP (turbo molecular pump) and a cryosorption pump (not illustrated) through valve 214 and the inside of beam treatment chamber 210 and the inside of plasma generation chamber 220 are adjusted to reduce the pressure for achieving a given vacuum degree.

In the plasma generation chamber 220, the inert gas (Ar, $N_2$Xe, Ne, or the like) introduced from a cylinder 230 to the plasma generation chamber 220 is ionized by arc discharge across a filament 222 for thermionic emission in the plasma generation chamber 220 and wall face 224, which is also used as an anode, of the plasma generation chamber, to generate a plasma. At this time, the filament 222 is heated by filament power supply 226 and, between the filament 222 and the wall face 224 of the plasma generation chamber, an arc voltage for arc discharge is applied from direct current ionization power supply (arc power supply) 228.

Furthermore, a magnet 240 installed in the outside of plasma generation chamber 220 creates the magnetic field in the plasma generation chamber 220 and, hence, the plasma can be trapped in the plasma generation chamber 220. By this, a high electrical field necessary for starting electric discharge can be achieved even in a low gas pressure area to promote plasma production.

Ions in the plasma generated are accelerated toward beam treatment chamber 210 by grid 250 installed in the boundary between plasma generation chamber 220 and beam treatment chamber 210 to generate an ion beam. Grid 250 is, for instance, composed of 3 porous electrodes, namely, a drawout electrode, accelerating electrode, and decelerating electrode and is applied with a given voltage.

The ion beam passed through the grid 250 is neutralized by passing through a neutralizer 260 such as the filament and generates an electrically neutral particle beam. This neutral particle beam is irradiated to the magnet body 10 on the stage 212 to carry out the treatment of the surface of magnet body 10. A beam irradiating time can be adjusted by opening and closing a shutter 270 installed in front of the magnet body.

In order to form amorphous layer 20 by such an ion beam treatment, the ion beam is irradiated to the magnet body 10 for the given time. Then, the magnet body 10 is relocated so that another face opposes to the shutter 270 to proceed the similar process. In such a way, the same irradiation operation is repeated for 6 faces of the magnet body 10 so as to form the amorphous layers 20 covering the whole area of the magnet body 10.

Next, the plasma treatment will be described.

Figure 6:
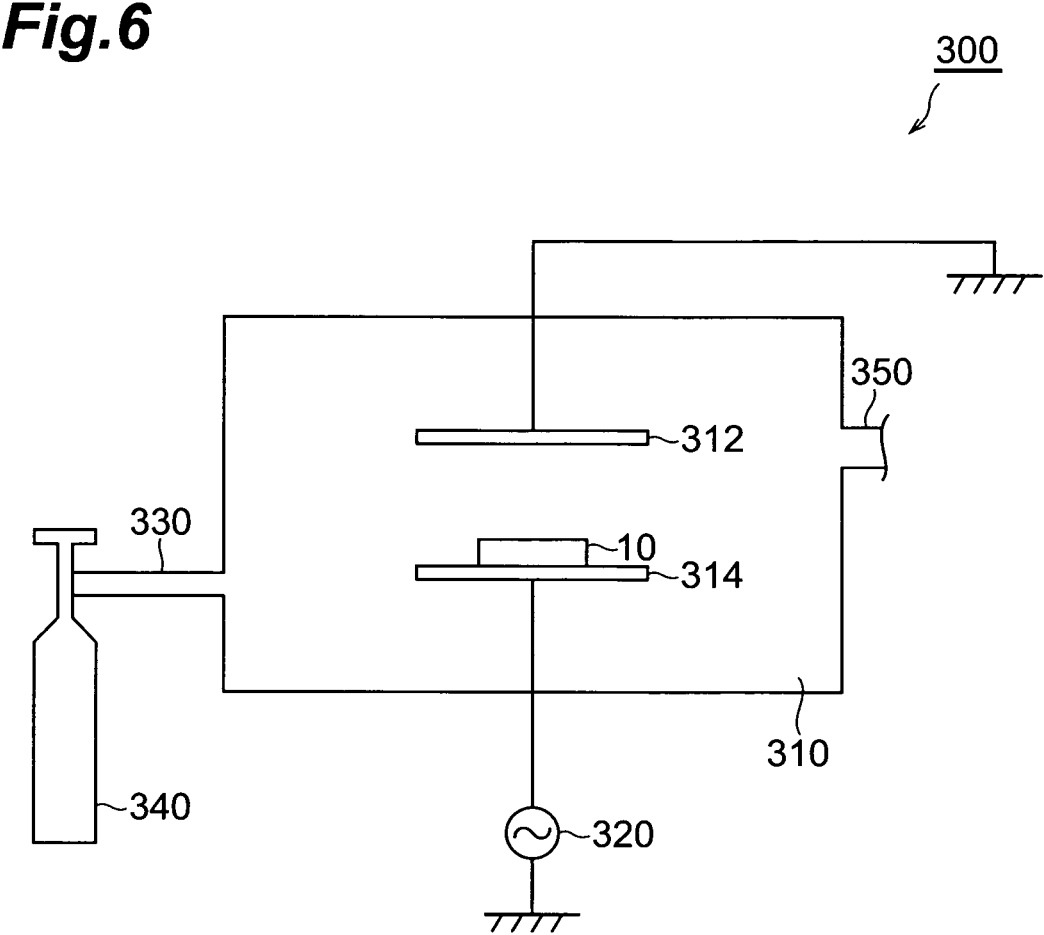
FIG. 6 A frontal diagrammatic view of an plasma treatment equipment used in the method for manufacturing the rare earth magnet according to the preferred embodiment.

A plasma treatment equipment 300 used for the present embodiment has, as shown in FIG. 6, a plasma treatment chamber 310 to form amorphous layer 20 on magnet body 10.

In this plasma treatment chamber 310, top plate electrode 312 and bottom plate electrode 314 are arranged in vertically opposite direction. The bottom plate electrode 314 has an electrically conductive portion. This electrically conductive portion is connected to high frequency power supply 320. The high frequency power supply 320 and the top plate electrode 312 are connected to a ground potential, which is in an identical potential. The high frequency power supply 320 generates high frequency electrical power having an arbitrary frequency properly selected from a given range of frequencies. On the other hand, the magnet body is mounted on the bottom plate electrode 314.

A plasma treatment chamber 310 is connected to a cylinder 340 through inert a gas introducing orifice 330. The plasma treatment chamber 310 is further connected to the exhaust system such as TMP and a cryosorption pump (not illustrated) through exhaust port 350 and the inside of plasma treatment chamber 310 have been adjusted to reduce the pressure for achieving a given vacuum degree.

When plasma treatment equipment, 300 constituted in such a way forms amorphous layer 20 on the magnet body 10, the inert gas (Ar, $N_2$, Xe, Ne, or the like) is introduced from the cylinder 340 to the plasma treatment chamber 310. Subsequently, after the plasma treatment chamber 310 is adjusted to reduce the pressure for achieving a given vacuum degree, the high frequency power is applied to the bottom plate electrode 314. By this, an electric field is generated in the plasma treatment chamber 310 and the plasma is produced by continuous glow discharge across the top plate electrode 312 and the bottom plate electrode 314. And, ions that are activated species, generated by dissociation of the inert gas is drawn into the bottom plate electrode 314 side by the potential applied across the top plate electrode 312 and the bottom plate electrode 314 to form amorphous layer 20 on the surface of magnet body 10 on the bottom plate electrode 314.

In order to form amorphous layer 20 by using such a plasma treatment, the magnet body 10 is subjected to the plasma treatment as described above and magnet body 10 is relocated so that another face opposes the top plate electrode 312 to proceed the similar process. In such a way, the same operation is repeated for 6 faces of the magnet body 10 so as to form the amorphous layers 20 covering the whole area of the magnet body 10.

It is preferable that when the amorphous layer 20 is formed on the surface of the magnet body 10 by using the method as described so far, the surface of amorphous layer 20 is adjusted to make the arithmetic mean roughness Ra to be 0.3 to 1.5 μm, and more preferable to be 0.1 to 1.5 μm. Although it is sufficient that the arithmetic mean roughness Ra in an arbitrary direction on the surface of amorphous layer 20 satisfies such a numeric range, it is preferable that roughness curves in 2 orthogonal directions of the surface satisfy the above-described condition. By this, the surface of amorphous layer 20, on which protecting layer 30 is formed, achieves an outstanding flatness and thereby, when protecting layer 30 is formed on the surface of amorphous layer 20, protecting layer 30 is firmly adhered and hardly peeled off.

When the arithmetic mean roughness Ra becomes larger than 1.5 μm, in the case where the film thickness of the protecting layer 30 is relatively thin, a local film thickness of protecting layer 30 region located at the projected portions of the surface of amorphous layer 20 becomes extremely thin. Therefore, there is a tendency that pinholes occur easily in the region. When the film thickness of protecting layer 30 is relatively thick, a local film thickness of protecting layer 30 region located at the recessed portions of the surface of amorphous layer 20 becomes extremely thick. Hence, there is a tendency that magnetic characteristics of the rare earth magnet 1 lower. On the other hand, when the arithmetic mean roughness Ra becomes smaller than 0.3 μm (particularly 0.1 μm) there is a tendency that protecting layer 30 peels off easily from amorphous layer 20.

Methods for adjusting the above described arithmetic mean roughness Ra concerning the amorphous layer within the numeric range as described include, for example, in the blast treatment, methods of selecting a kind of abrasive grains, a mean grain diameter of abrasive grains, and a optimal shape of abrasive grains, in the ion beam treatment, a method of adjusting a colliding time of particles to the surface of magnet body 10 by using a shutter and the like, and in the plasma treatment, a method of adjusting an output of the high frequency power supply.

In any treatments, the above described arithmetic mean roughness Ra can be made within the numeric range as mentioned earlier by adjusting the collision speed of colliding solid particles or particle beams to the surface of magnet body 10.

In the rare earth magnet 1 according to the present embodiment, in view point of the anticorrosion property and in view point of securing sufficient magnetic characteristics, the film thickness of amorphous layer 20 is preferably ranges from 0.5 to 1.2 μm, more preferably ranges from 0.1 to 1.2 μm, furthermore, in view point of a production cost, preferably ranges from 0.3 to 2.0 μm, and more preferably ranges from 0.01 to 2.0 μm.

(Protecting Layer)

A protecting layer 30 is formed on the surface of amorphous layer 20. The constitutional materials thereof are not specifically restricted, as long as the material is usable one for the protecting layer of general rare earth magnets. For example, metal, metal oxide, metal nitride, oxynitride, resin, chemically converted film or the like are included.

For instance, protecting layer 30 made from metal as the constitutional material includes metal plating having antioxidation property such as nickel, copper and zinc, metal alloy plating or composite plating therewith. Methods for forming this metal layer include plating method, ion plating method, and vapor phase method such as deposition and spattering. Methods for plating include electroless plating and electrolytic plating. Specifically, the constitutional metal material capable of constituting the protecting layer includes aluminum, tantalum, zirconium, hafnium, niobium, silicon, titanium, magnesium, chromium, nickel, barium, molybdenum, vanadium, tungsten, zinc, strontium, iron, bismuth, boron, calcium, gallium, germanium, lanthanum, lead, or indium. These can be applied as singly or in combination of two or more kinds.

Protecting layer 30 made from the metal oxide or metal nitride as the constitutional material includes oxides or nitrides of, for example, aluminum, tantalum, titanium, zirconium, hafnium, and niobium. Methods for forming an oxide layer or nitride layer above described include a publicly known deposition techniques including, for example, vapor deposition method such as vacuum deposition method, spattering method, ion plating method, CVD method, or thermal spraying method, liquid deposition method such as coating method or solution deposition method, or sol-gel method.

More specifically, the metal oxide for constituting protecting layer 30 preferably include oxides of aluminum, tantalum, zirconium, hafnium, niobium, silicon, titanium, magnesium, chromium, nickel, barium, molybdenum, vanadium, tungsten, zinc, strontium, iron, bismuth, boron, calcium, gallium, germanium, lanthanum, lead, or indium. One or more kinds of oxides of these elements can be used.

Nitrides for constituting protecting layer 30 include nitrides of silicon, aluminum, tantalum, titanium, zirconium, hafnium, niobium, magnesium, chromium, nickel, molybdenum, vanadium, tungsten, iron, boron, gallium, germanium, bismuth, manganese, barium, lanthanum, yttrium, calcium, strontium, cerium, or beryllium. One or more kinds of these can be used. In addition, for oxynitrides, those containing elements preferable for nitrides as described above are preferable.

Resins for forming protecting layer 30 include phenolic resin, epoxy resin, melamine resin, and xylene resin. These can be applied as single material or in combination thereof. Among these resins, as protecting layer 30 containing resins as the constitutional material, an epoxy-based paint can be named. As methods for forming the resin layer, such method can be used that solving the constituent above described into a solvent such as ketone to prepare a coating solution, coating it to the surface of the amorphous layer employing such as blade coating method, wire bar coating method, spray coating method, immersion coating method, bead coating method, air knife coating method, curtain coating method, and dip spin coating method, and then, heating or keeping this magnet body 10 in air to evaporate the solvent in the coating solution, and thereby the resin layer is formed.

In addition, the chemically converted film enabling to form protecting layer 30 includes at least one kind of the chemically converted film selected from the group composed of chromium, cerium, molybdenum, tungsten, manganese, magnesium, zinc, silicon, zirconium, vanadium, titanium, iron and phosphor, and particularly preferable is a phosphate of chromium, cerium, molybdenum, tungsten, manganese, magnesium, zinc, silicon, zirconium, vanadium, titanium, or iron.

In the rare earth magnet 1 according to the present embodiment, in view point of improving the anticorrosion property and in view point of securing sufficient magnetic characteristics, the film thickness of protecting layer 30 is preferably ranges from 5 to 100 μm, furthermore, in view point of the production cost, preferably ranges from 1 to 30 μm.

The rare earth magnet according to the present embodiment shows no corrosion in the salt spray test as described above and also in a thermo-hygrostat test and a pressure cooker test, which are methods for evaluation of the anticorrosion property. "Thermo-hygrostat test" is the anticorrosion property evaluation test designated in JIS-C-0097-2001, which is to expose a test sample to an atmosphere of 85° C. and 85% relative humidity for 504 hours followed by observation of a corrosion state. On the other hand, the "pressure cooker test" is the test by exposing the test sample to the atmosphere of 120° C. under saturated water vapor for 24 hours followed by observation of the corrosion state.

Second Embodiment

Next, the rare earth magnet and the manufacturing method thereof according to the second embodiment will be described. The rare earth magnet according to the second embodiment comprises the magnet body and the amorphous layer covering the magnet body.

(Preparation of Magnet Body)

Figure 8:
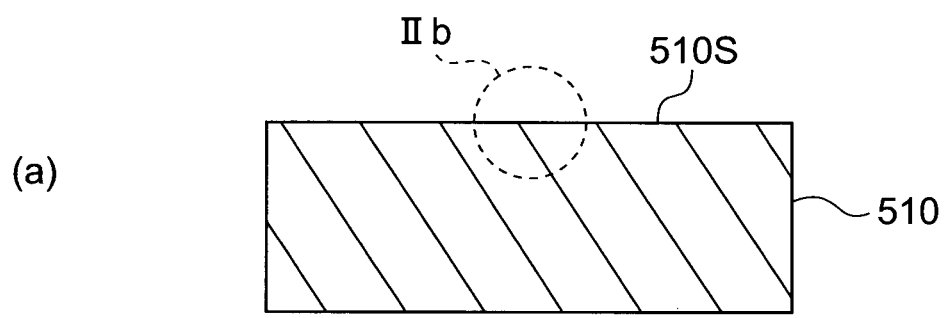
FIG. 8 A view showing diagrammatically a sectional constitution of magnet body 510 according to the second embodiment.
Figure 8:
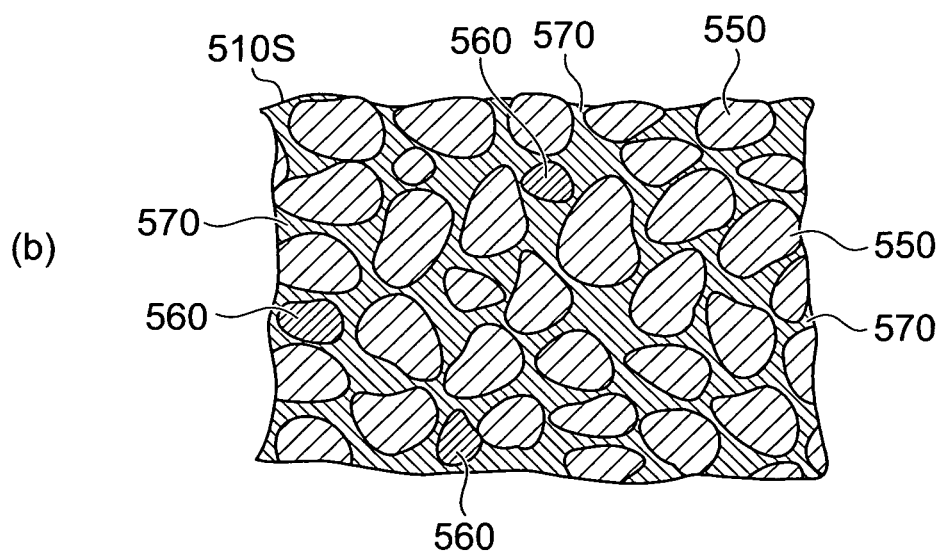

First, as shown in FIG. 8(a) a polycrystal magnet body 510 containing a rare earth element is prepared.

Magnet body 510 is a magnet containing R, iron (Fe) boron (B). For this magnet body 510, the one having the same composition as that of the magnet body 10 described in the first embodiment and being obtained by the same manufacturing method as that can be applied.

FIG. 8(b) shows an enlarged view of the part IIb of the magnet body 510. The magnet body 510 contains, similar to the magnet body 10 as described above, main crystal phase 550 having the substantially tetragonal crystal structure, grain boundary phase 570 located between these main crystal phases 550 and containing much rare earth elements, and crystalline boron rich crystal phase 560 containing relatively much boron and formed in grain boundary phase 570 and has the polycrystal structure. The grain size of main crystal phase 550, which is a magnetic phase, ranges preferably from about 1 to 100 μm. Boron rich crystal phase 560 and grain boundary phase 570 are nonmagnetic phase. These boron rich crystal phase 560 and grain boundary phase 570 are contained in the magnet body 510 normally in a degree ranging from about 0.5 volumetric percents to 50 volumetric percents. And, such the polycrystal structure exposes to the surface 510s of magnet body 510.

(Amorphization)

Figure 9:
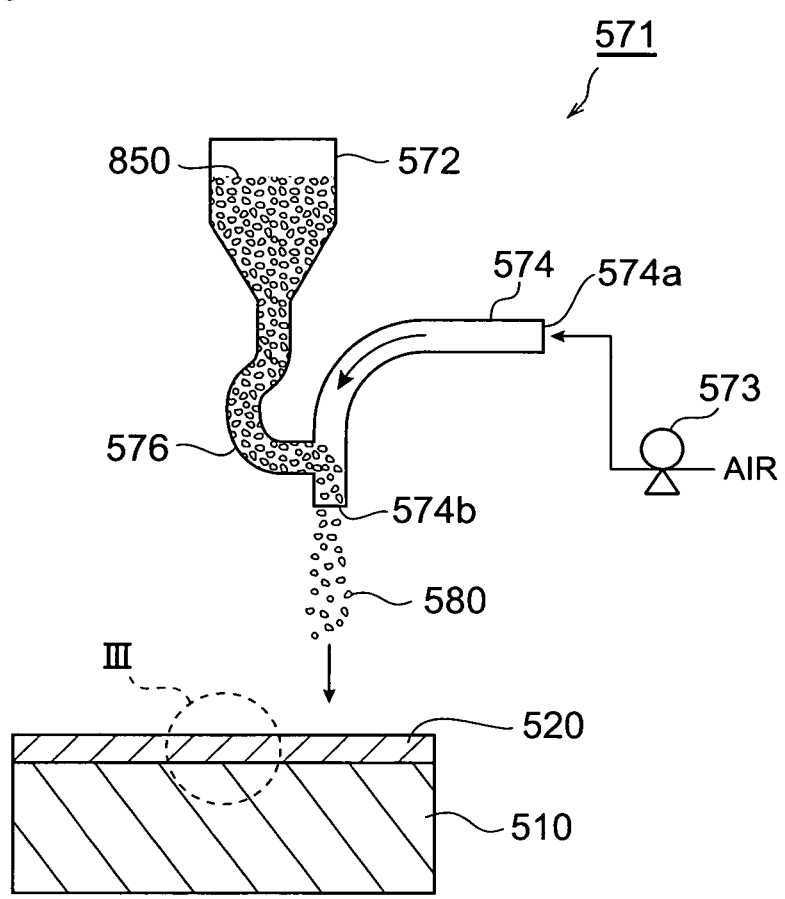
FIG. 9 A diagrammatic view showing a step following the magnet body shown in FIG. 1, in the manufacturing method according to the second embodiment.
Figure 10:
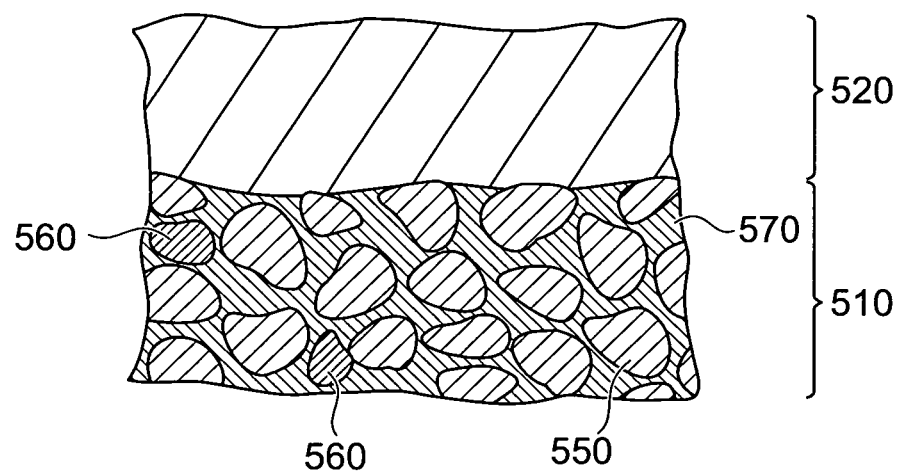
FIG. 10 An enlarged sectional view of part III of FIG. 9.

Subsequently, the surface layer of magnet body 510 is amorphized to form an amorphous layer 520 as shown in FIG. 9 and FIG. 10.

Here, amorphous is, as described above, a structure, in which atoms are irregularly arrayed, has not a specific crystal structure, namely, not a periodic array structure. Whether the surface layer of rare earth magnet 600 is amorphous or polycrystal is readily determined by, for example, conducting electron diffraction method and X-ray diffraction method and check whether a peak derived from a crystal lattice can be observed with significance. In case of amorphous, the peak derived from the crystal is not observed. Whether amorphous or polycrystal is readily determined by observations using a TEM.

Specifically, giving a shock to the surface layer of magnet body 510 can form an amorphous layer 520. More specifically, as shown in FIG. 9, jetting a group of grains (abrasive grains) 580 to the surface layer of magnet body 510 to perform collision against the surface can convert the surface layer of magnet body 510 to the amorphous state, resulting in the amorphous layer 520. Particularly, adoption of so-called shot peening method in which groups of globular grains 580 are shot against the surface layer of magnet body 510, can preferably perform conversion to the amorphous state without much wear of the surface layer in the process. Note that, jetting abrasive grains and the like which are nonglobular grains can amorphize the surface as well.

Materials of grains of grain group 580 include, as described above, ceramics such as $SiO_2$, SiC, $Al_2O_3$, and metals such as iron.

Jetting such the grain group 580 can be readily conducted by a publicly known blast apparatus 571, for example, as shown in FIG. 9.

This blast apparatus 571 comprises jet nozzle 574, pump 573 for supplying air to inlet 574a of jet nozzle 574, hopper 572 for storing grain group 580, and introduction pipe 576 for introducing grain group 580 exhausted from the bottom end of hopper 572 to the side somewhat before outlet 574b of jet nozzle 574.

Outlet 574b of jet nozzle 574 is located toward the surface layer of magnet body 510 and, when the gas is supplied from pump 573, grain group 580 is drawn form hopper 572 through introduction pipe 576 and jetted from outlet 574b of jet nozzle 574 toward magnet body 510. Jetted grain group 580 strikes the surface layer of magnet body 510.

In this way, the temperature of magnet body 510 at forming amorphous layer 520 is not specially restricted, but preferably the temperature while forming the layer is at a level that does not deteriorate magnetic characteristics of the magnet body 510. In such view point, it is preferable to maintain the temperature to 500° C. or lower and more preferable to maintain to 300° C. or lower.

In this way, when the shock is repeatedly given to the surface layer of the magnet body 510, a plastic micro deformation occurs repeatedly in the surface layer in correspondence to this. Therefore, it is presumed that by shearing and compressing actions at this time, the regular atomic structure is broken to amorphize and the amorphous layer 520 is formed as shown in FIG. 9 and FIG. 10. And, in the case that amorphization occurs by giving shocks, relatively compact structured amorphous layer 520 is formed, which improves anticorrosion property further.

Figure 11:
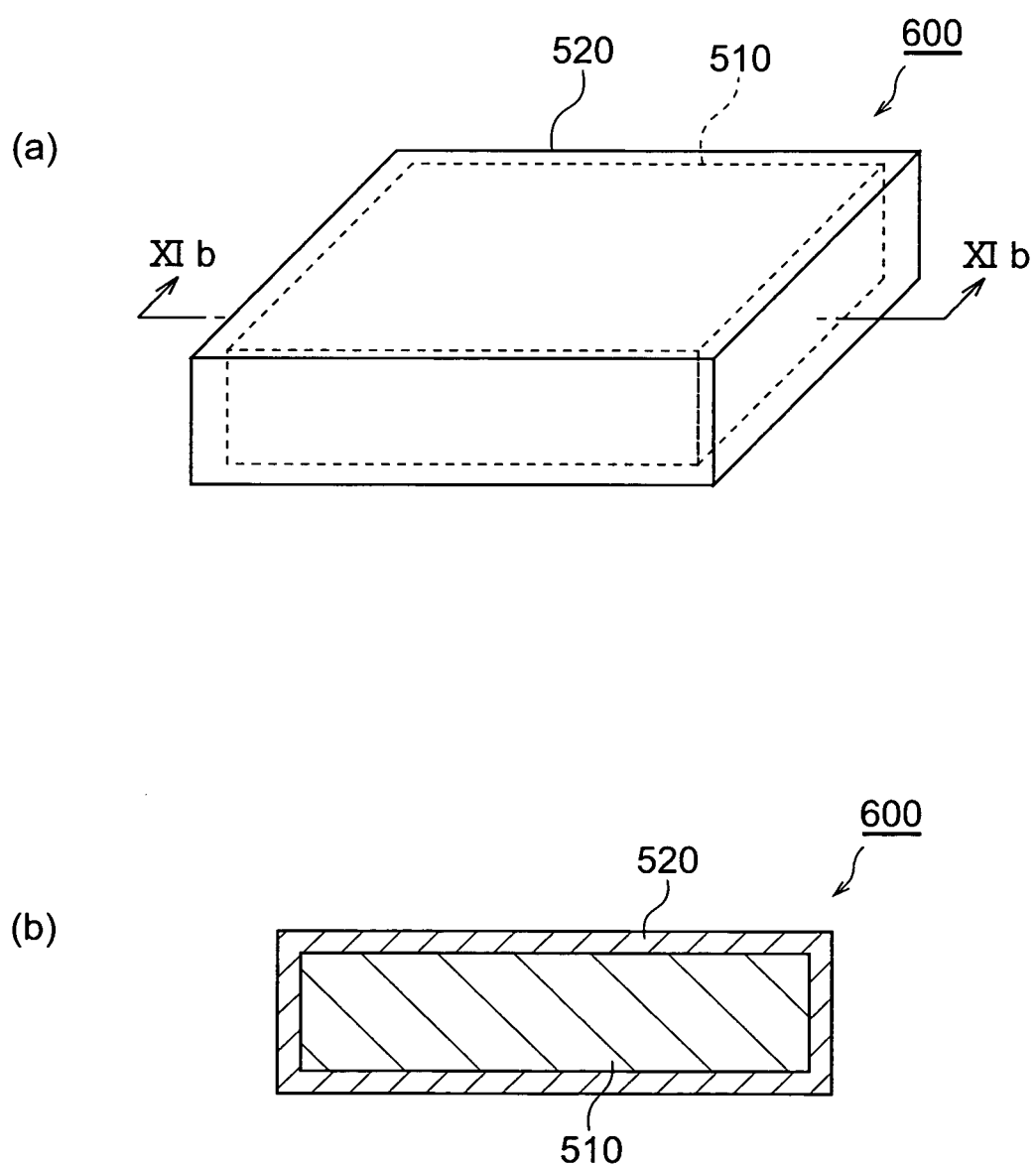
FIG. 11 A view for explanation of the rare earth magnet according to the second embodiment.
Figure 12:
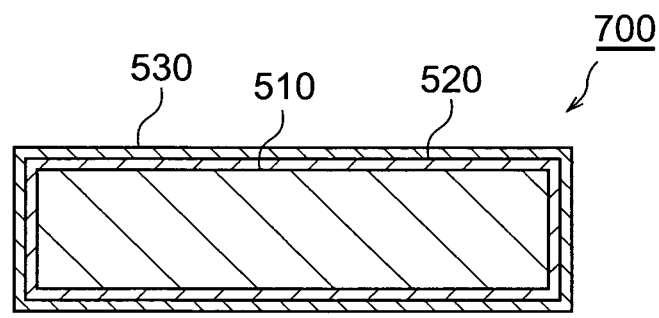
FIG. 12 A schematic sectional view showing the rare earth magnet according to the third embodiment.

And here, by jetting grain group 580 evenly to the whole surface layer of magnet body 510, and a rare earth magnet 600 as shown in FIG. 11(a) and FIG. 11(b) is obtained.

The rare earth magnet 600 obtained in such a way according to the present embodiment comprises a magnet body 510 and an amorphous layer 520 covering the whole surface layer of the magnet body 510.

Here, in the rare earth magnet 600 according to the present embodiment, the film thickness of amorphous layer 520 is preferably ranges from 0.1 to 20 μm in view point of improving the anticorrosion property and in view point of securing enough magnetic characteristics, and furthermore, preferably ranges from 0.3 to 10 μm in view point of the production cost and the like.

Also according to the embodiment described above, the boundary between the magnet body 510 and the amorphous layer 520 may have a region where the polycrystal and the amorphous substances are mixed.

According to the present embodiment, an amorphous layer 520 is formed on the magnet body 510. In the amorphous layer 520 having the amorphous structure, there is almost no regular atomic structure but an irregular structure. Therefore, in the amorphous layer 520, there is almost no part (refer to FIG. 5) where corrosive substance disperses selectively with easy like grain boundary phase 570 located between main crystal phases 550 in the polycrystal structure of the magnet body 510. Consequently, corrosive substances such as oxygen hardly disperse inside of the amorphous layer 520 and the amorphous layer works sufficiently as a protecting layer to protect the magnet body 510 from the corrosive substances such as oxygen.

In the present embodiment, the surface layer of the magnet body 510 is amorphized to be the amorphous layer 520, therefore, the amorphous layer 520 contains all the elements such as rare earth elements R, iron, and boron constituting the magnet body 510. Owing to this, physical properties such as coefficient of thermal expansion of the magnet body 510 are close to that of the amorphous layer 520. Thus, adhesion performance between the amorphous layer 520 and the magnet body 510 is improved and occurrence of cracks in amorphous layer 520, peeling off from the magnet body 510 and the like are suppressed sufficiently.

In addition, since the surface layer of the magnet body 510 is amorphized by collision of grain group 580, any different elements from composing elements of the magnet body 510 are not mixed in the amorphous layer 520. Namely, in the magnet body 510 and the amorphous layer 520, compositional ratios of elements such as R, iron, and boron composing magnet 510 are substantially equal. Now that things has come to this, physical properties of the magnet body 510 becomes very close to those of the amorphous layer 520, and thus the adhesion performance between the two is further improved, which is preferable.

In such a way, when the amorphous layer becomes hard to be peeled off, generation of contaminants such as particles from the rare earth magnet becomes very few, which is preferable.

Here detection and quantification of constitutional elements in the magnet body 510 and the amorphous layer 520 can be conducted by publicly known composition analysis methods such as EPMA (X-ray microanalyzer method), XPS (X-ray photoelectron spectroscopy), AES (Auger electron spectroscopy), or EDS (energy dispersive fluorescence X-ray spectroscopy). In addition, each layer in the rare earth magnet 600, which is exposed by using a publicly known approach such as etching, or a new sectional face, which appears by cutting the rare earth magnet 600, are analyzed by composition analysis methods described above, and thereby, it is possible to grasp a composition distribution of the compositional material for each layer mentioned above.

Moreover, in the present embodiment, since no heating is required for magnet body 510 when the amorphous layer 520 is formed, the magnet body 510 is not exposed to a high temperature, deterioration of magnetic characteristics of the magnet body 510 can be suppressed, and a rare earth magnet 600 having high magnetic characteristics can be provided.

Third Embodiment

Next, a rare earth magnet and a manufacturing method thereof according to the third embodiment will be described. The rare earth magnet according to the third embodiment comprises a magnet body, an amorphous layer covering the magnet body, and a chemically converted film covering the amorphous layer. In this rare earth magnet, the passivation layer is formed on the amorphous layer by the chemical conversion treatment of the surface layer of the amorphous layer in the rare earth magnet according to the second embodiment. In other words, in the rare earth magnet according to the first embodiment described earlier, the protecting layer corresponds to the chemically converted film.

Here, the chemical conversion treatment is a treatment of subjecting the surface layer of amorphous layer 520 to a chemical reaction to make a passivation layer 530, anticorrosion property of which is improved than the original amorphous layer 520, which is different from coating of another layer on the amorphous layer 520.

A chemical conversion treatment method includes, for example, the surface layer of amorphous layer 520 is contacted to nitric acid, oxygen plasma, or ozone to form a compact oxide film as a passivation film. In addition, it is another example that the surface layer of amorphous layer 520 is contacted to an aqueous solution of zinc phosphate to form a compact phosphate film as the passivation film. Alternatively, the chemical conversion treatment using a zirconium-based treatment solution, manganese-based treatment solution, molybdenum-based treatment solution instead of the aqueous solution of zinc phosphate can also form the protecting layer.

The action effect of such a passivation layer 530 will be described below. As shown in the first embodiment, although the rare earth magnet 600, in which the amorphous layer 520 is exposed directly to air, has the sufficient anticorrosion property, the amorphous layer 520 itself is gradually corroded to some extent occasionally depending upon a kind of magnet body 510 of the rare earth magnet 600, namely, the constitutional component of the magnet body 510, for example, the kind and concentration of rare earth elements. And, passivation layer 530 according to the present embodiment, inhibits to corrode the amorphous layer 520 and, thus, the anticorrosion property of the rare earth magnet 700 is further improved and reliability is further improved.

Particularly, the passivation layer 530 formed by the chemical conversion treatment has a high adhesion to the amorphous layer 520 and is hardly peeled off, being different from coating another layer thereon, and therefore, the anticorrosion property is sufficiently maintained and the life is prolonged.

In the rare earth magnet 700 according to the present embodiment, the film thickness of passivation layer 530 is, in view of the anticorrosion property, preferably ranges from 0.1 to 20 μm and, furthermore, in view point of the production cost, the film thickness of passivation layer 530 ranges preferably from 1 to 5 μm.

Also, in view point of securing sufficient magnetic characteristics, the film thickness of amorphous layer 520 is preferably ranges from 0.1 to 20 μm, furthermore, in view point of the production cost, more preferably ranges from 0.3 to 10 μm.

The preferred embodiments of the present invention have been described so far. However, the present invention is not restricted to the embodiments described above.

For instance, in the blast treatment as described earlier, a speed of bombarding abrasive grains (particle group) against the magnet body and a bombarding angle of abrasive grains against the magnet body may be adjusted to remove the oxide film on the magnet body firstly, followed by readjustment of these speed and angle and the blast treatment described above may be carried out to form the amorphous layer. Furthermore, in modes of forming the protecting layer according to the first and third embodiments described above, the amorphous layer may not be formed. Even in such rare earth magnet, the oxide film on the surface of the magnet body has been removed, and hence, the adhesion property of the magnet body to the protecting layer is excellent.

The shape of the rare earth magnet in other embodiments according to the present invention is not restricted to be a rectangular parallelopiped as illustrated and it is sufficient to be a shape suitable for the use. Specifically, in case using for a driving unit of a hard disk apparatus or an automobile motor, the shape thereof may be a pillar shape having an arcuately cut section. And for using in an industrial processing machine, an annular and discoid shapes is possible.

The compositional materials of the magnet body according to other embodiment include those containing one or more species of rare earth elements and Co or those containing one or more species of rare earth elements and Fe and nitrogen (N). Specifically, for example, those containing Sm and Co such as $Sm-Co_5$-based or $Sm_2-Co_{17}$-based (numbers express atomic ratios), those containing Sm and Fe and N such as Sm—Fe—N-based, those containing Nd and Fe and B such as Nd—Fe—B are exemplified. Also in case of using compositional materials as described above, it is preferable that the composition ratio of elements contained in the amorphous layer is substantially identical to the composition ratio of main component elements contained in the magnet body. Specifically, for example, in case of the Sm—Fe—N-based magnet, Sm and Fe and N, which are main component elements contained in the magnet body, have preferably the identical composition ratio between those component elements contained in the magnet body and those elements contained in the amorphous layer.

According to the embodiment described earlier, the amorphous layer is formed on all faces of the magnet body. If required, the amorphous layer may be formed on only the desired portion on the surface of the magnet body. Similarly, according to the first or third embodiment, the amorphous layer is formed on all faces of the magnet body and the protecting layer (passivation layer) is formed on all faces of the amorphous layer. It is possible to cover the desired portion on the surface of the magnet body with the amorphous layer and further form the passivation layer on all faces or the desired portion of this amorphous layer.

In the blast treatment according to the embodiment as described earlier, the shock is given to the surface layer of the magnet body by using abrasive grains (particle group). The surface layer of the magnet body may be struck by a hammer, not the abrasive grain (particle group). Also the surface layer of the magnet body can be amorphized by such a method that the magnet body is put in a barrel together with medium such as grains followed by rotating the barrel to make the medium give the shock to the surface layer of the magnet body. In addition, other than giving the shock to the surface layer of the magnet body, the surface layer of the magnet body may be subjected to irradiation of the atomic beam, molecular beam, ion beam, and electron ray beam.

Note that in the case where amorphization is conducted by irradiation of the atomic beam, molecular beam and ion beam, elements move from the outside to the amorphous layer and composition ratios of elements constituting the magnet body becomes unidentical with the amorphous layer. However, also in this case a difference in the composition ratios is sufficiently small and high adhesion performance is achieved in a certain degree.

In the rare earth magnet described above, the amorphous layer can be formed by, for example, sputtering using a target containing the material of the magnet body.

Uses of the rare earth magnet include a line printer, starter and motor for an automobile, special motor, servo motor, dick drive for magnetic recording apparatus, linear actuator, voice coil motor, equipment motor, industrial motor, speaker, magnet for magnetic resonance diagnosis, and the like. Particularly, in case of using in an environment where automobile motor oil scatters, the anti-oxidation property of the protecting layer is not sufficient and it is difficult to realize the rare earth magnet having sufficiently excellent anticorrosion property. Also in such view point, the rare earth magnet obtained by the present embodiment has resistibility against a variety of corrosion causative matters such as sulfides, water, and salt water, and hence has sufficiently excellent anticorrosion property.

EXAMPLES

The present invention will be described in detail below further with reference to examples. However, the present invention is not restricted to these examples.

Example A

Example 1a

First, a sintered body having a composition of 14Nd-1Dy-7B-78Fe (numbers express atomic ratios) prepared by powder metallurgy was subjected to a heat treatment in an Ar gas atmosphere at 600° C. for 2 hours. Next, the sintered body following the heat treatment was cut in a 56×40×8 (mm) size and subjected to chamfering by the barrel polishing treatment to make the magnet body.

Next, the obtained magnet body was washed by using an alkaline degreasing solution, and then the surface of the magnet body was activated using a 3% nitrate aqueous solution, washed again with water thoroughly.

Subsequently, the surface of the magnet body was subjected to the ion beam treatment for 10 minutes by using an ion beam treatment apparatus same as that shown in FIG. 5. At this time, the pressure of the inside of the beam treatment chamber and the inside of the plasma generation chamber was reduced to $2 \times 10^6$ Pa and, then, an Ar gas was introduced into the plasma generation chamber in a flow rate of 20 scc/minutes, and a filament power supply and an ionization power supply were regulated to 50 V, 20 A and 20 V, 0.5 A respectively to generate plasma. In addition, a grid was applied with a voltage of about 1.5 kV to generate an ion beam.

Furthermore, tetraethoxysilane and water were evaporated in a nitrogen atmosphere to conduct the normal pressure thermal CVD method to form a 100 nm $SiO_2$ layer (protecting layer). In such a way, the rare earth magnet according to the example 1A was obtained.

Example 2a

Steps until thorough washing with water of the magnet body were carried out in the same way as those of the example 1A and the magnet body was prepared and the surfaces were washed.

Subsequently, the surface of the magnet body was subjected to the plasma treatment by using the plasma treatment apparatus shown in FIG. 6. At this time, the inside of the plasma generation chamber was reduced to 20 Pa and, then, an Ar+N2 (Ar=15 scc/minutes, N2=20 scc/minutes) gases was introduced into the plasma generation chamber. Frequency of the high frequency power supply was set at 13.56 MHz and an output from the high frequency power supply was set at 400 W. By this, a 200 V self-bias was made.

In addition, plating treatment was carried out with nickel to form a 15-μm nickel-plated layer (protecting layer). In this way, the rare earth magnet according to the example 2A was obtained.

Example 3a

Steps until thorough washing with water of the magnet body were carried out in the same way as those of the example 1A and the magnet body was prepared and the surfaces were washed.

Subsequently, the surface of the magnet body was subjected to the blast treatment with #60-sized steel grains as abrasive grains for 10 minutes by using the blast treatment apparatus shown in FIG. 4. Here, the pressure for jetting abrasive grains from a jet nozzle was set at 0.3 MPa.

Moreover, aluminum was plasma-evaporated to form a 10 μm aluminum layer (protecting layer). In this way, the rare earth magnet according to the example 3A was obtained.

Comparative Example 1a

Steps until thorough washing with water of the magnet body were carried out in the same way as those of the example 1A and the magnet body was prepared and the surfaces were washed.

Then, the plating treatment was carried out using nickel to form a 15 μm nickel layer (protecting layer). In this way, a nickel-plated layer according to the comparative example 1A was obtained.

<Observation of Crystal State>

First, rare earth magnets according to the example 1A to 3A and the comparative example 1A were cut along the laminate direction of each layer. Then, a cut face exposed by this cutting was subjected to a TEM observation. As the result, in rare earth magnets according to examples 1A to 3A, between the surface side of the rare earth magnet and the vicinity of the center, three layers (which is named as the first layer, the second layer, and the third layer from the surface side) were observed. In addition, in the third layer, the presence of grains was observed.

On the other hand, in the rare earth magnet of the comparative example 1A, two layers were observed.

Next, using the X-ray diffraction method, observation was made for the crystal state of each layer as described above of rare earth magnets according to examples 1A to 3A and the comparative example 1A. As a result, in any one of rare earth magnets according to examples 1A to 3A, diffraction patterns suggesting the presence of crystals were observed in the first layer and the third layer. On the other hand, in the second layer, diffraction patterns suggesting the presence of crystals were not observed.

Figure 7:
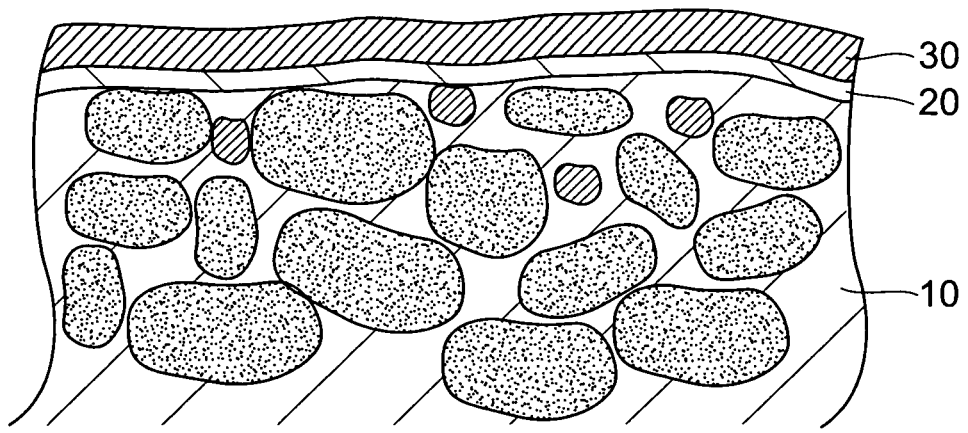
FIG. 7 A diagrammatic enlarged view showing the phase constitution of the R—Fe—B-based magnet according to the embodiment.

FIG. 7 shows a diagrammatically enlarged section, which is supposed from the result as described above, showing rare earth magnets according to examples 1A to 3A. Namely, the rare earth magnet according to the example 1A is, supposedly, in the stacking state, from the surface side thereof, made of the protecting layer 30 containing the amorphous structure (the first layer), amorphous layer 20 (the second layer), and the layer of magnet body 10 containing crystals (the third layer). In addition, rare earth magnets according to examples 2A to 3A are, supposedly, in the stacking state, from the surface side thereof, made from protecting layer 30 containing crystals (the first layer), amorphous layer 20 (the second layer), and the layer of magnet body 10 containing crystals (the third layer).

Detailed examinations of the sectional structure of rare earth magnets according to examples 1A to 3A showed that the roughness of the boundary between the magnet body 10 and the amorphous layer 20 ranged from 1.27 to 1.45 μm as Ra and, in contrast, the roughness of the boundary between the amorphous layer 20 and the protecting layer 30 ranged from 0.68 to 0.85 μm as Ra. From this result, it was known that formation of amorphous layer 20 improved the surface roughness of rare earth magnets.

On the other hand, for the rare earth magnet according to the comparative example 1A, the observation of the crystal state was made in the same way and the diffraction pattern suggesting the presence of crystals was observed in both two layers.

<Anticorrosion Property Evaluation>

For obtained rare earth magnets according to examples 1A to 3A and the comparative example 1A, the salt spray test designated in JIS-C-0023-1989 was carried out for 24 hours to evaluate the anticorrosion property.

As the result, in the salt spray test, corrosion was not observed in the rare earth magnets according to examples 1A to 3A, however, corrosion was observed in the rare earth magnet according to comparative examples 1A.

Moreover, following the above anticorrosion property evaluation, the state of the protecting layer was observed. The surface of the protecting layer was observed by using an electron microscope (SEM). No peeling off of the protecting layer was observed on the rare earth magnets according to examples 1A to 3A. On the other hand, for the rare earth magnet according to the comparative example 1A, partial peeling off of the protecting layer was observed.

Example B

Example 1B

First, a rectangular solid sintered body having the composition of 14Nd-1Dy-7B-78Fe (numbers express atomic ratios) prepared by powder metallurgy was used as the magnet body and an $SiO_2$ globular grains group was jetted to the magnet body to make the whole face of the surface layer amorphous. Here, a blowing pressure of grains was set at 0.4 MPa (about 4 kgf/cm$^2$) to jet grains of 0.5 kg in total for 30 seconds. In this way, the rare earth magnet according to examples 1A was obtained.

Observation of the section of the obtained rare earth magnet by employing TEM showed that the surface layer became the amorphous layer having an amorphous nature, which is contrastive to the polycrystal nature of the magnet body. The thickness of this amorphous layer was 2 μm.

Example 2B to 4B

For the surface layer of the amorphous layer of the rare earth magnet obtained in the same way as that of example 1B, an additional chemical conversion treatment was conducted to form the passivation layer and the rare earth magnets according to examples 2B to 4B were obtained.

In example 2B, the chemical conversion treatment was conducted with conditions of $H_3PO_4$: 12.5 g/L, ZnO: 1.3 g/L, $NaNO_3$: 3.9 g/L, and $NaNO_2$: 0.1 g/L and soaking the amorphous layer of the rare earth magnet in the aqueous solution of zinc phosphate, of which pH was adjusted to 2.8 with NaOH, at 65° C. for 2 minutes.

In example 3B, the chemical conversion treatment was conducted by soaking the amorphous layer of the rare earth magnet in nitric acid of a 3% concentration for 2 minutes.

In example 4B, chemical conversion treatment was conducted in such condition that the amorphous layer of the rare earth magnet was exposed to an oxygen plasma, which was generated by high frequency (13.56 MHz) excitation with 250-W power supply, and 2 Pa pressure when discharging, for 5 minutes exposure.

Comparative Example 1B

The magnet body lacking the amorphous layer was subjected to surface oxidation treatment at a 600° C. heat treatment temperature for 20 minutes in the argon atmosphere, of which oxygen partial pressure was 1 Torr to convert the surface layer of the magnet body to a lower class oxide layer of the magnet body material as a protecting layer.

Comparative Example 2B

The surface of the magnet body lacking the amorphous layer was coated with an about 20-μm epoxy resin-made protecting layer to make the protecting layer.

Comparative Example 3B

The surface layer of the magnet body lacking the amorphous layer was subjected to the chemical conversion treatment by using the aqueous solution of zinc phosphate according to example 2B to form the passivation layer.

In order to examine the anticorrosion property and magnetic characteristics, rare earth magnets of examples 1B to 4B and Comparative examples 1B to 3B were subjected to the following evaluation test. FIG. 13 shows the obtained results by compilation.

The obtained rare earth magnets were subjected to a 24-h thermo-hygrostat test (PCT test) in the water vapor atmosphere at 120° C. and a 2 atmospheric pressure.

The rare earth magnets obtained from examples 1B to 4B showed no reduction of weight before and after the PCT test.

On the other hand, by a visual observation of rare earth magnets after the PCT test showed no occurrence of a defect such as pinholes and cracks on the amorphous layer and the passivation layer as the protecting layer of the rare earth magnet. In addition, a flux loss before and after the PCT test range was within a 0.24%, which was measurement error range. And the residual flux density of the rare earth magnet after the PCT test was 398 mT or higher.

On the other hand, rare earth magnets obtained from comparative examples 1B to 3B showed 0.3% or higher weight reduction. The visual observation of rare earth magnets after the PCT test showed many occurrences of powders on the surface. The flux loss before and after the PCT test was as high as 8.4% or higher value. The residual flux density of the rare earth magnet after the PCT test was 353 mT or lower.

The invention claimed is:

1. A rare earth magnet comprising:
a magnet body containing a rare earth element;
an amorphous layer formed on a surface of the magnet body and containing amorphous substance; and
a protecting layer formed on a surface of the amorphous layer, wherein
the magnet body is polycrystalline and contains polycrystal substance,
a boundary between the magnet body and the amorphous layer includes a region where the polycrystal substance of the magnet body and the amorphous substance of the amorphous layer are mixed,
the amorphous layer has a film thickness from 0.3 to 10 μm,
the protecting layer consists of aluminum,
the amorphous layer is amorphized from a surface of the magnet body and contains an element identical to a main component element of a magnet material contained in the magnet body,
a roughness Ra of a boundary between the magnet body and the amorphous layer ranges from 1.27 to 1.45 μm,
a roughness Ra of a boundary between the amorphous layer and the protecting layer ranges from 0.68 to 0.85 μm, and
a coefficient of thermal expansion of the magnet body is substantially similar to a coefficient of thermal expansion of the amorphous layer.

* * * * *